United States Patent
Yadav et al.

(10) Patent No.: US 12,002,951 B2
(45) Date of Patent: Jun. 4, 2024

(54) BUFFER INTERLAYERS IN MEMBRANELESS HIGH VOLTAGE BATTERIES

(71) Applicant: Urban Electric Power Inc., Pearl River, NY (US)

(72) Inventors: Gautam G. Yadav, Pearl River, NY (US); Aditya Upreti, Pearl River, NY (US); Meir Weiner, Pearl River, NY (US); Jinchao Huang, Pearl River, NY (US); Xia Wei, Pearl River, NY (US); Sanjoy Banerjee, Pearl River, NY (US)

(73) Assignee: URBAN ELECTRIC POWER INC., Pearl River, NY (US)

( * ) Notice: Subject to any disclaimer, the term of this patent is extended or adjusted under 35 U.S.C. 154(b) by 0 days.

(21) Appl. No.: 17/365,691

(22) Filed: Jul. 1, 2021

(65) Prior Publication Data
US 2022/0006078 A1    Jan. 6, 2022

Related U.S. Application Data

(60) Provisional application No. 63/047,351, filed on Jul. 2, 2020.

(51) Int. Cl.
| *H01M 10/36* | (2010.01) |
| *H01M 4/42*  | (2006.01) |
| *H01M 4/505* | (2010.01) |
| *H01M 4/62*  | (2006.01) |
| *H01M 4/66*  | (2006.01) |

(52) U.S. Cl.
CPC ............ *H01M 4/42* (2013.01); *H01M 4/505* (2013.01); *H01M 4/622* (2013.01); *H01M 4/625* (2013.01); *H01M 4/662* (2013.01); *H01M 10/36* (2013.01)

(58) Field of Classification Search
CPC ........ H01M 4/42; H01M 4/505; H01M 4/622; H01M 4/625; H01M 4/662; H01M 10/36
See application file for complete search history.

(56) References Cited

U.S. PATENT DOCUMENTS

| 2014/0227574 A1* | 8/2014 | Savinell | H01M 8/04186 429/105 |
| 2020/0313212 A1* | 10/2020 | Loretz | H01M 8/1041 |
| 2021/0194065 A1* | 6/2021 | Mitra | H01M 4/661 |

OTHER PUBLICATIONS

Merriam-Webster definition of 'membrane' (Year: 2009).*

* cited by examiner

*Primary Examiner* — Christopher P Domone
*Assistant Examiner* — Kimberly Wyluda
(74) *Attorney, Agent, or Firm* — Andrew M. Metrailer; Conley Rose, P.C.

(57) ABSTRACT

A membraneless battery comprising a cathode comprising a cathode electroactive material; an anode comprising an anode electroactive material; a catholyte in contact with the cathode, wherein the catholyte is not in contact with the anode; an anolyte in contact with the anode, wherein the anolyte is not in contact with the cathode; and one or more buffer interlayers disposed between the anolyte and the catholyte. The catholyte has a pH of less than 4, and the anolyte has a pH of greater than 10. The one or more buffer interlayers regulate a pH in the battery. The anode electroactive material comprises a Zn electroactive material. At least one of the one or more buffer interlayers comprises a weak acid and its conjugate base; and/or at least one of the one or more buffer interlayers comprises a weak base and its conjugate acid.

50 Claims, 10 Drawing Sheets

BUFFER INTERLAYERS IN MEMBRANELESS HIGH VOLTAGE BATTERIES

CROSS-REFERENCE TO RELATED APPLICATIONS

This application claims the benefit of U.S. Provisional Application No. 63/047,351 filed on Jul. 2, 2020 and entitled, "BUFFER INTERLAYERS IN MEMBRANELESS HIGH VOLTAGE BATTERIES," which is incorporated herein by reference in its entirety for all purposes.

STATEMENT REGARDING GOVERNMENTALLY SPONSORED RESEARCH OR DEVELOPMENT

None.

BACKGROUND

Energy storage is becoming increasingly important in the modern world for the grid, powering personal electronics and electromobility. Electromobility, which includes electric vehicles, electric bikes and scooters, etc., is being adopted in the major economies of the world and is increasingly being pushed into the developing economies as well in order to reduce the carbon dioxide emissions that that stem from gasoline-powered vehicles and bikes. Lithium (Li)-ion batteries are usually the batteries of choice for these high powered and high energy applications at least in part because the Li-ion system has high voltage characteristics. Additionally, several engineering and chemistry developments through the decades have allowed the Li-ion battery system to evolve to high specific and volumetric energy densities. However, the safety aspects of the Li-ion battery chemistry have not been solved yet, and this has unfortunately resulted in explosion and fire hazards that have been reported in several news articles. Solutions to these issues have been sought by developing battery management systems to avoid explosive side reactions from taking place and including cooling systems to prevent uncontrollable heat getting generated, but such solutions increase the cost of the battery system. Further, there is a human and ethical cost to developing Li-ion batteries, wherein cobalt, a main ingredient of the Li-ion battery chemistry, is being mined from the poorer regions in Africa without the use of safe practices. The lack of safety measures during cobalt mining has resulted in the generations of artisanal miners inheriting birth defects because of the toxic properties of cobalt.

The development of high voltage zinc (Zn)-manganese dioxide ($MnO_2$) batteries ($MnO_2$|Zn batteries) has the potential to mitigate the issues posed by the Li-ion battery systems. High voltage $MnO_2$|Zn batteries may employ decoupled electrolytes for the cathode and anode side, which may result in the creation of a high voltage aqueous battery (HiVAB), wherein decoupling the electrolytes could increase the voltage of a traditional alkaline $MnO_2$|Zn battery from about 1.5 V to about 2.5 V-3 V by using an acid electrolyte on the $MnO_2$ side and an alkaline electrolyte on the Zn side. Typically, the operation of such a $MnO_2$|Zn battery having both an acid electrolyte and an alkaline electrolyte would be impossible owing to the immediate neutralization reactions that would take place on mixing the acid electrolyte and the alkaline electrolyte; and the use of expensive ion-exchange membranes (e.g., Nafion membranes, bipolar membranes) would be necessary to allow operation of this battery. However, such membranes are relatively expensive and can stifle the entry of a promising battery into the market. In some instances, the operation such a $MnO_2$|Zn battery having both an acid electrolyte and an alkaline electrolyte can be achieved with the use of relatively inexpensive cellulose-based separators like cellophane by interfacially engineering the alkaline electrolyte to remain stable in the presence of acid. An ongoing need exists for the development of batteries with earth abundant, safe and non-toxic ingredients that also possess characteristics of high voltage and capacity to match Li-ion's battery performance characteristics.

SUMMARY

In some embodiments, a membraneless battery comprises a cathode comprising a cathode electroactive material; an anode comprising an anode electroactive material; a catholyte in contact with the cathode, wherein the catholyte is not in contact with the anode; an anolyte in contact with the anode, wherein the anolyte is not in contact with the cathode; and one or more buffer interlayers disposed between the anolyte and the catholyte. The catholyte has a pH of less than 4, and the anolyte has a pH of greater than 10. The one or more buffer interlayers regulate a pH in the battery. The anode electroactive material comprises a Zn electroactive material. At least one of the one or more buffer interlayers comprises a weak acid and its conjugate base; and/or at least one of the one or more buffer interlayers comprises a weak base and its conjugate acid.

In some embodiments, a membraneless high voltage zinc (Zn)-anode battery comprises a cathode comprising a cathode electroactive material; an anode comprising an anode electroactive material, wherein the anode electroactive material comprises a Zn electroactive material; in contact with the cathode, wherein the catholyte is not in contact with the anode; an anolyte in contact with the anode, wherein the anolyte is not in contact with the cathode; and one or more buffer interlayers disposed between the anolyte and the catholyte. The catholyte has a pH of less than 2, and the anolyte has a pH of greater than 12. The one or more buffer interlayers regulate a pH in the battery. The one or more buffer interlayers comprise at least one acidic buffer interlayer and/or at least one basic buffer interlayer; wherein the at least one acidic buffer interlayer, when present, contacts the anolyte; and wherein the at least one basic buffer interlayer, when present, contacts the catholyte. At least one of the one or more buffer interlayers comprises a weak acid and its conjugate base; and/or at least one of the one or more buffer interlayers comprises a weak base and its conjugate acid.

These and other features will be more clearly understood from the following detailed description taken in conjunction with the accompanying claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DESCRIPTION

Figure 1A:
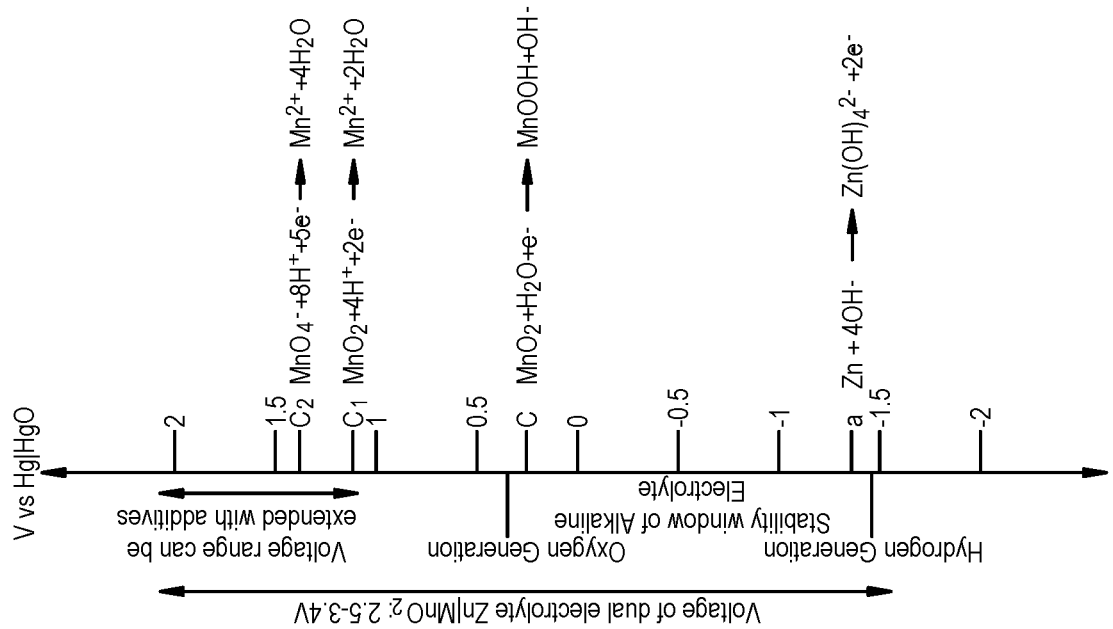
FIG. 1A-1D illustrate schematic drawings of a manganese dioxide ($MnO_2$)|zinc (Zn) ($MnO_2$|Zn) battery according to some embodiments.
Figure 1A:
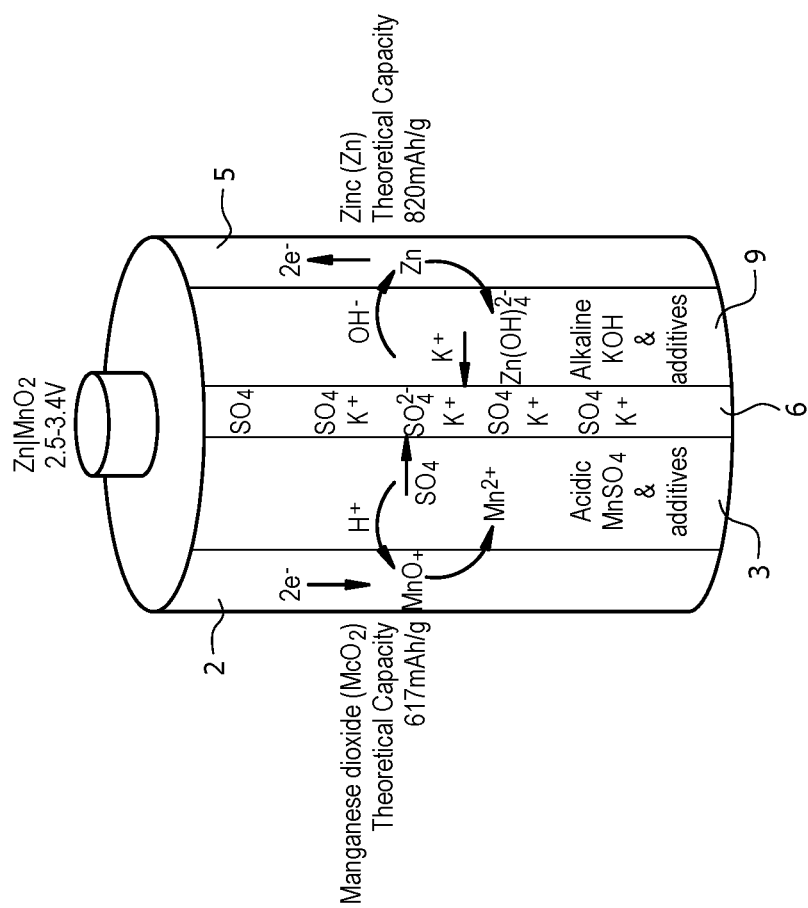

In this disclosure, the terms "negative electrode" and "anode" are both used to mean "negative electrode." Likewise, the terms "positive electrode" and "cathode" are both used to mean "positive electrode." Reference to an "electrode" alone can refer to the anode, cathode, or both. Reference to the term "primary battery" (e.g., "primary battery," "primary electrochemical cell," or "primary cell"), refers to a cell or battery that after a single discharge is disposed of and replaced. Reference to the term "secondary battery" (e.g., "secondary battery," "secondary electrochemical cell," or "secondary cell"), refers to a cell or battery that can be recharged one or more times and reused. As used herein, a "catholyte" refers to an electrolyte solution in contact with the cathode without being in direct contact with the anode, and an "anolyte" refers to an electrolyte solution in contact with the anode without being in direct contact with the cathode. The term electrolyte alone can refer to the catholyte, the anolyte, or an electrolyte in direct contact with both the anode and the cathode.

Energy storage systems like batteries are required for a range of applications like grid-based, electromobility, electric vehicles, solar storage, uninterruptible power sources, personal electronics, etc. Lithium-ion and lead acid batteries currently dominate the market; however, they are expensive, flammable and contain toxic elements. Aqueous based metal anode systems like zinc (Zn)-anode batteries can compete with lithium and lead on volumetric and gravimetric energy densities when paired with a relatively inexpensive and abundant material cathode like manganese dioxide (MnO$_2$).

In the context of zinc (Zn)-manganese dioxide (MnO$_2$) batteries (MnO$_2$|Zn batteries), irreversibility may arise when maximum utilization is tried to be attained which leads to problems like volume expansion, breakdown of crystal structure to form spinels, redistribution of active material, zinc poisoning of the cathode, passivation of the metallic anode and dendritic shorts. When employed as the electrolyte, potassium hydroxide (KOH) is the source of some of the problems mentioned. During discharge the 4$^+$ state of Mn reduces to the 3$^+$ state which leads to an increase in its solubility in high KOH concentration at high capacity utilization. The loss of active Mn' ions is the cause of capacity loss in the battery. Also, the dissolved Mn' ions can also dissociate to form Mn$^{4+}$ and Mn$^{2+}$ ions which can lead to the formation of lower oxides like spinels Mn$_3$O$_4$ and pyrochroite [Mn(OH)$_2$]. The reactions get complicated further as Zn delivers its capacity through a dissolution reaction where it forms dissolved zincate ions [Zn(OH)$_4{}^{2-}$]. These dissolved zincate ions also react with the dissolved Mn ions to form inactive Zn spinels like ZnMn$_2$O$_4$. The Zn anodes can also form dendrites during charge which can penetrate the separator to short the battery.

Another problem of the Zn anodes is the active redistribution of the active materials during the dissolution reaction, which leads to a loss of active ions from the current collector and thus, loss in capacity. The cathode also undergoes large volume expansion during its discharge reaction as the protons from the electrolyte intercalate into the crystal structure and this leads to the active material denuding from the current collector and thus, loss in capacity again. Decoupling electrolyte strategies on the cathode and anode side has allowed the advent of high voltage (>about 2 V and <about 5 V) aqueous-based batteries possible. However, these strategies have relied on the use of expensive ion-exchange membranes and ceramic-based membranes. High cost of membranes is often a deterrent to a successful battery chemistry to entering the market.

In this disclosure, a buffer gel interlayer is disclosed, wherein the buffer gel interlayer maintains the pH gradient between the acid and alkaline electrolyte and prevents the neutralization reactions that limit the high voltage discharge characteristics of the MnO$_2$|Zn battery. This is the first such disclosure of a buffer gel interlayer that eliminates the need of relatively expensive ion-exchange layers and ceramic membranes. Also disclosed herein is a membraneless high voltage aqueous battery, where the cathode and anode electrolytes are gelled or polymerized and separated by the buffer gel interlayer.

In this disclosure, a high voltage membraneless battery is disclosed, wherein the membraneless battery displays no need of expensive ion-exchange and ceramic membranes to regulate exchange of ions. The electrolytes in this membraneless battery are separated by a buffer interlayer, which can be gelled or polymerized. For purposes of the disclosure herein, the term "buffer" as it pertains to the buffer interlayer is defined as having the standard chemistry meaning, wherein the buffer is an aqueous solution consisting of a mixture of a weak acid and its conjugate base or a weak base and its conjugate acid. The pH of the buffer interlayer as disclosed herein changes very little with the addition of a small amount of strong acid or base, as described in more detail below.

In this disclosure, a method of making high voltage membraneless batteries through altering the hydrogen (or proton) and hydroxyl activity for the cathode and anode sides of the battery, wherein the zones of hydrogen activity and hydroxyl activity are separated by a buffer interlayer, is disclosed. Generally, a MnO$_2$ cathode can provide for a MnO$_2$|Zn battery to cycle between 1 V and 5 V. Specifically, a MnO$_2$ cathode can provide for a high voltage membraneless MnO$_2$|Zn battery as disclosed herein to cycle between 2 V and 5 V. Altering (e.g., increasing) the hydrogen activity on the MnO$_2$ cathode can increase the discharge potential of a MnO$_2$|Zn battery between 3 and 3.5 V as disclosed herein, which is the highest discharge potential achieved for this chemistry. The high voltage membraneless battery as disclosed herein can discharge the theoretical two electron capacity (617 mAh/g) of MnO$_2$ reversibly for thousands of cycles. The high voltage membraneless MnO$_2$|Zn battery as disclosed herein can be also used for primary or single use applications.

In some embodiments, the cathode electroactive material suitable for use in the cathode of the high voltage membraneless Zn-anode battery as disclosed herein may comprise manganese dioxide ($MnO_2$), manganese oxides ($Mn_2O_3$, $Mn_3O_4$, MnO), manganese hydroxides (MnOOH, $Mn(OH)_2$), silver oxides (AgO, $Ag_2O$), silver (Ag), nickel (Ni), nickel oxide (NiO, $Ni_2O_3$), nickel hydroxides (NiOOH, $Ni(OH)_2$), cobalt oxide ($Co_3O_4$, CoO), cobalt hydroxides, lead (Pb), lead oxide (PbO, $PbO_2$), copper (Cu) oxide, Cu, copper hydroxide, potassium iron oxide ($K_2FeO_4$), barium iron oxide ($BaFeO_4$), copper hexacyanoferrate, lithium iron phosphate, lithium nickel manganese cobalt oxide, lithium manganese oxide ($LiMn_2O_4$, $Li_2MnO_3$), calix[4]quinone, 1,4-napththoquinone, 9,10-anthraquinone, vanadium oxide, or any combination thereof.

In this disclosure, the high voltage membraneless battery may employ a $MnO_2$ cathode. The $MnO_2$ cathode is most famously paired with a Zn anode in the primary alkaline battery, wherein its open circuit potential is usually around 1.5 to 1.7 V. The average discharge potential of this battery ($MnO_2$|Zn) is about 1.3 V. The $MnO_2$|Zn battery has a relatively very high theoretical capacity of 617 mAh/g based on two electron reactions. The $MnO_2$|Zn battery displays rechargeable characteristics relative to its one-electron (308 mAh/g) and two-electron (617 mAh/g) capacities in alkaline electrolytes. Despite advantageous relatively high capacity characteristics of the $MnO_2$|Zn battery, its relatively high voltage has been considered an Achilles heel for use in applications like personal electronics. As disclosed herein, by altering the hydrogen and hydroxyl activity in the catholyte and anolyte of the $MnO_2$ and Zn electrodes, respectively, the average discharge potential of this battery system can be advantageously increased to equal to or greater than about 3 V. The conventional $MnO_2$|Zn battery chemistry in either aqueous or non-aqueous electrolyte does not achieve a discharge potential of equal to or greater than about 3 V. The high voltage membraneless battery as disclosed herein exhibiting a discharge potential of equal to or greater than about 3 V can open its use in personal electronics, electric vehicles and other important applications powering the modern green economy.

Rechargeable characteristics of the membraneless $MnO_2$|Zn battery as disclosed herein can be obtained by the addition of dopants or additives to the electrodes and/or electrolytes. The anode material can contain additives that enhance electrochemical activity and reduce gassing in the electrolyte. For electrode dopants, bismuth oxide, bismuth, indium, indium oxide, indium hydroxide, copper oxide, copper, aluminum oxide, aluminum, lead oxide, lead, bismuth sulfide, silver oxide, silver, nickel, nickel oxide, nickel hydroxide, cobalt and cobalt oxide, and any salts thereof, or any combination thereof can be used in both the cathode and the anode. Zn electrodes tend to gas in electrolytes with high hydroxyl activity. For inhibiting gassing of Zn electrodes, additives like bismuth, bismuth oxide, indium, indium oxide, indium hydroxide, cationic surfactants like cetyltrimethylammonium bromide, anion surfactants like sodium dodecyl sulfate, sodium dodecylbenzene sulfonate, polyethylene glycol, zinc oxide, carboxymethyl cellulose, polyvinyl alcohol, or any combination thereof can be used. Electrolyte additives (e.g., catholyte additive) can include manganese sulfate, nickel sulfate, potassium permanganate, manganese chloride, manganese acetate, manganese triflate, bismuth chloride, bismuth nitrate, manganese nitrate, nickel sulfate, nickel nitrate, zinc sulfate, zinc chloride, zinc acetate, zinc triflate, indium chloride, copper sulfate, copper chloride, lead sulfate, sodium persulfate, potassium persulfate, ammonium persulfate, ammonium chloride, vanillin, potassium chloride, sodium chloride, or any combination thereof.

The separation of electrolytes of varying strengths is important to prevent any neutralization reactions from taking place. In some embodiments, the separation of electrolytes can be achieved by gelling the electrolytes which physically prevents them from mixing, in addition to having the zones of hydrogen activity and hydroxyl activity separated by a buffer interlayer. Use of crosslinkers and ionomers in the gelling process can also prevent the crossover of ions between the anolyte and the catholyte, in addition to having the zones of hydrogen activity and hydroxyl activity separated by a buffer interlayer. The electrolyte gelling process can be done through the use of free radical polymerization process. Acrylamides and acrylic acids can be made into long polymer chains by mixing with either electrolytes of high proton or hydroxyl activity. Crosslinkers like N,N'-methylenebisacrylamide (MBA) can be used to increase the strength of the polymers and make it more viscous and impart it self-healing properties. The gelling or polymerization of electrolytes can be conducted with the use of initiators like potassium or sodium or ammonium persulfate.

An advantage of having a dual electrolyte cell with relatively high proton activity in the catholyte on the cathode side and relatively high hydroxyl activity in the anolyte on the anode side is an increase in cell potential. A relatively high proton activity on the cathode side and a relatively high hydroxyl activity on the anode side can increase the cell potential, which in turn can lead to higher average discharge voltages and thus, higher energy from the cell.

In this disclosure, a high voltage membraneless aqueous battery is disclosed, wherein the high voltage membraneless aqueous battery displays average discharge potentials between 2 V and 5 V, which relatively high average discharge potentials are made possible due to the presence of buffer interlayers separating the zones of hydrogen activity from the zones of hydroxyl activity. The high voltage properties are achieved through decoupling of electrolytes with different strengths related to hydrogen (or proton) and hydroxyl activity on the cathode and anode side, respectively. This battery can be of single use (e.g., primary batteries) or can be made rechargeable (e.g., secondary batteries). In some cases, long term rechargeability can be obtained through the use of additives or dopants. The buffer interlayers completely remove the need of expensive ion-exchange or ceramic membranes. The buffer interlayers regulate the pH within the battery system, which helps to maintain the high voltage properties of the battery for long periods of operation. The separation of the different components of the membraneless battery system as disclosed herein can be achieved through gelation of electrolytes and buffer solution with free radical polymerization or any suitable polymerization route. The complete polymerization of all components of this battery constitute a membraneless battery, wherein there is no need for any membranes to separate the gel constituents.

Applications for such a high voltage membraneless $MnO_2$|Zn battery could be in grid-scale energy storage, traction batteries, aerospace applications, electric vehicles, power packs, telecommunications, uninterruptible power supply (UPS), medical applications, etc., to name a few. Some embodiments of the cell or battery design where it could be used is shown in FIGS. 1A-1D. A prismatic and cylindrical battery design is shown, but the design of the high voltage membraneless $MnO_2$|Zn battery as disclosed herein is not limited to these battery form factors. The battery comprises a cathode, an anode, an electrolyte, and a buffer interlayer. The designs shown in FIGS. 1A-1D are just a guide and are non-limiting.

In this disclosure, the high voltage membraneless $MnO_2|Zn$ battery can be made of any geometric form factor if desired. To those skilled in the art, the high voltage membraneless $MnO_2|Zn$ battery can be cylindrical or prismatic. Further, the high voltage membraneless $MnO_2|Zn$ battery can also be made flexible if desired, by gelling of electrolytes, buffer interlayers and electrodes or by using binders in electrodes that allow for flexibility.

Figure 1B:
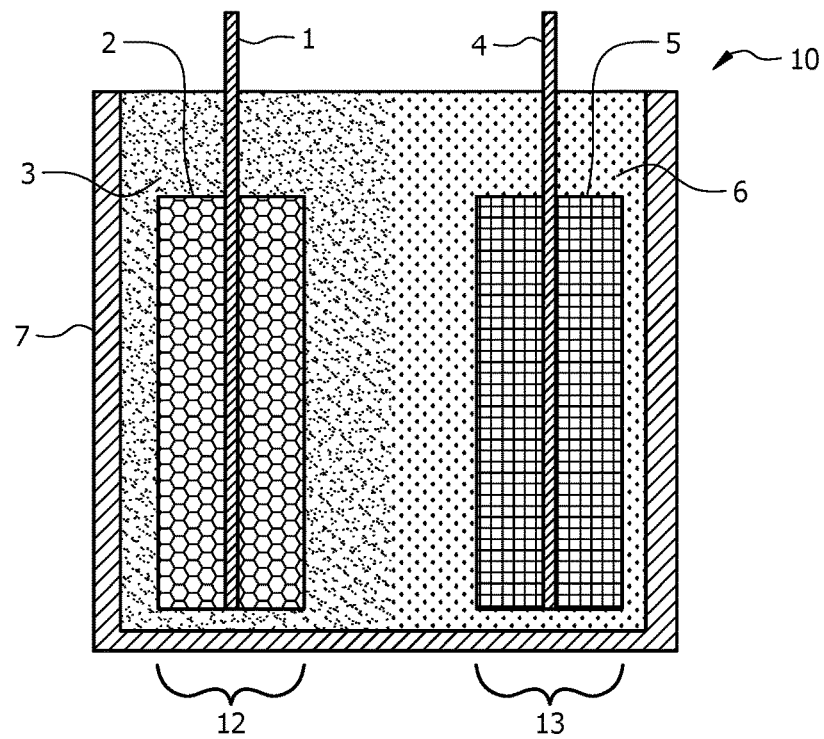
Figure 1C:
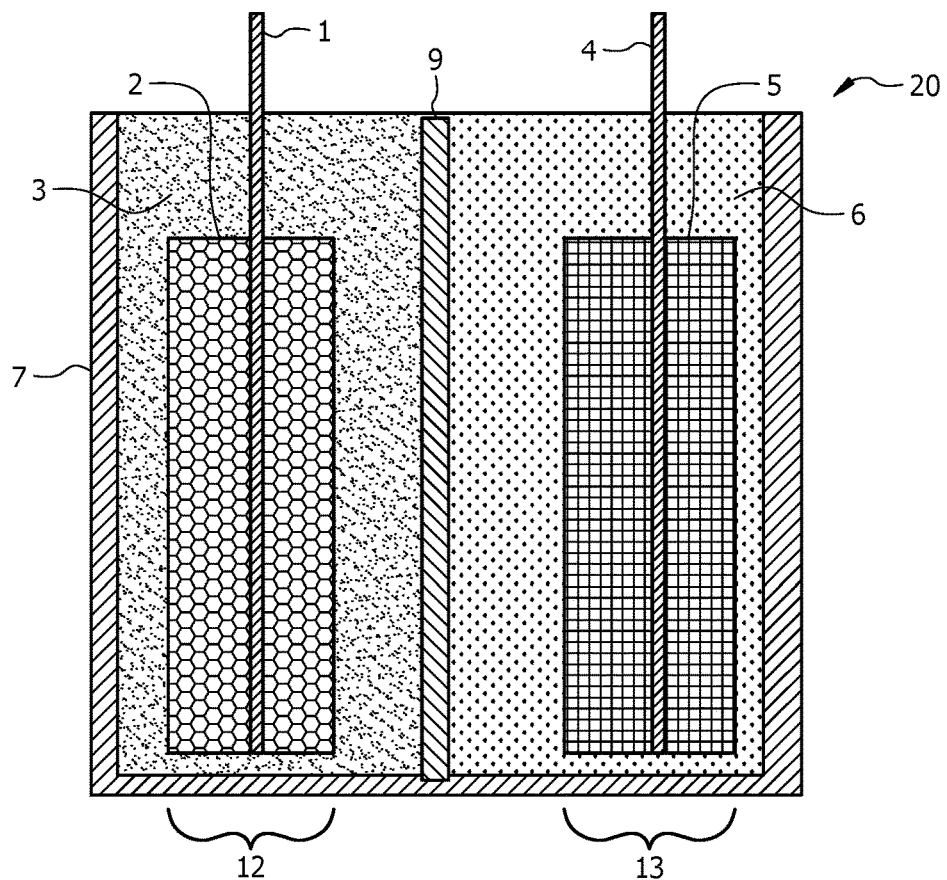
Figure 1D:
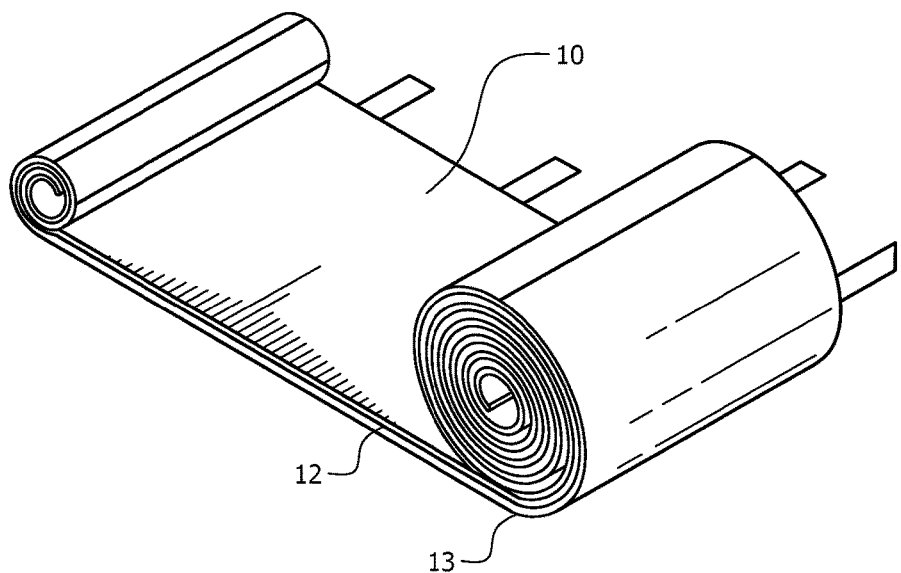

Referring to FIGS. 1A-1D, a battery 10 can have a housing 7, a cathode 12, which can include a cathode current collector 1 and a cathode material 2, and an anode 13. In some embodiments, the anode 13 can comprise an anode current collector 4, and an anode material 5. It is noted that the scale of the components in FIGS. 1A-1D may not be exact as the features are illustrated to clearly show the electrolyte around the anode 13 and the cathode 12. FIGS. 1A-1C show a prismatic battery arrangement having a single anode 13 and cathode 12. In another embodiment, the battery can be a cylindrical battery (e.g., as shown in FIG. 1D) having the electrodes arranged concentrically or in a rolled configuration in which the anode and cathode are layered and then rolled to form a jelly roll configuration. The cathode current collector 1 and cathode material 2 are collectively called either the cathode 12 or the positive electrode 12, as shown in FIG. 1D. Similarly, the anode material 5 with the optional anode current collector 4 can be collectively called either the anode 13 or the negative electrode 13. An electrolyte can be in contact with the cathode 12 and the anode 13. As described in more detail herein, the electrolyte in contact with both the cathode 12 and the anode 13 can be substantially the same; or alternatively, different electrolyte compositions can be used with the anode 13 and the cathode 12 to modify the properties of the battery 10 in some embodiments.

In some embodiments, the battery 10 can comprise one or more cathodes 12 and one or more anodes 13, which can be present in any configuration or form factor. When a plurality of anodes 13 and/or a plurality of cathodes 12 are present, the electrodes can be configured in a layered configuration such that the electrodes alternate (e.g., anode, cathode, anode, etc.). Any number of anodes 13 and/or cathodes 12 can be present to provide a desired capacity and/or output voltage. In the jellyroll configuration (e.g., as shown in FIG. 1D), the battery 10 may only have one cathode 12 and one anode 13 in a rolled configuration such that a cross section of the battery 10 includes a layered configuration of alternating electrodes, though a plurality of cathodes 12 and anodes 13 can be used in a layered configuration and rolled to form the rolled configuration with alternating layers.

In an embodiment, housing 7 comprises a molded box or container that is generally non-reactive with respect to the electrolyte solutions in the battery 10, including the electrolyte. In an embodiment, the housing 7 comprises a polymer (e.g., a polypropylene molded box, an acrylic polymer molded box, etc.), a coated metal, or the like.

As disclosed herein, decoupling the electrolytes for the cathode side and the anode side of the battery increases the voltage by using an acid catholyte 3 and an alkaline anolyte 6. FIG. 1A displays the conceptual mechanism of such a high voltage aqueous $MnO_2|Zn$ battery. The reactions taking place on the acid and alkaline side of the battery are shown in the potential diagram depicted on the right-hand side of FIG. 1A. The $MnO_2$ cathode 2 can access reactions at higher potentials in the acid compared to the alkaline electrolyte, which when paired with the Zn reactions in the alkaline electrolyte 5, which are on the lowest potentials, allows to create a battery achieving voltages between 2.5 V and 3.4 V.

Figure 2:
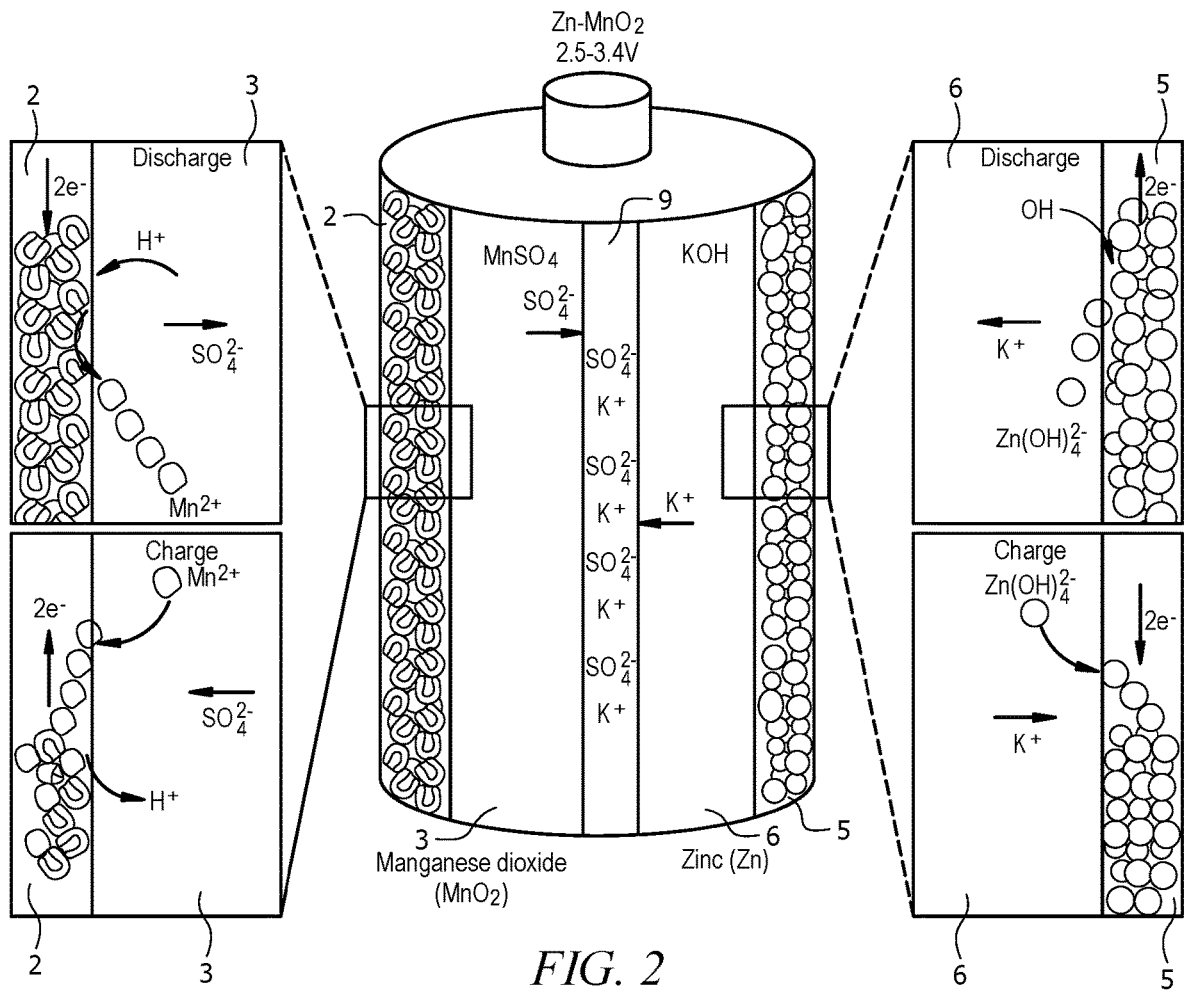
FIG. 2 illustrates a schematic drawing of electrochemical reactions in a $MnO_2$|Zn battery.

The acid side potential can be further increased with the use of additives that increase the proton concentration. FIG. 2 displays the detailed electrochemical discharge and charge reactions taking place in the high voltage $MnO_2|Zn$ battery. Typically, the operation of such a battery as shown in FIGS. 1A and 2 would be impossible because of the immediate neutralization reactions that would take place on mixing the acid and alkaline electrolytes. As disclosed herein, the use of one or more buffer interlayers mitigates this issue, thereby enabling the functioning of the high voltage membraneless $MnO_2|Zn$ battery as disclosed herein.

In some embodiments, the cathode 12 can be manganese dioxide. The manganese dioxide can be of various polymorphs like alpha-phase, beta-phase, gamma-phase, epsilon-phase, delta-phase (which is a layered phase called birnessite), ramsdellite, lambda-phase, a mixture of the different phases, electrolytic manganese dioxide (EMD), chemically modified manganese dioxide, and any combination thereof.

The cathode 12 can comprise a mixture of components including an electrochemically active material (e.g., cathode electroactive material). Additional components such as a binder, a conductive material, and/or one or more additional components can also be optionally included that can serve to improve the lifespan, rechargeability, and electrochemical properties of the cathode 12. The cathode 12 can comprise a cathode material 2 (e.g., an electroactive material, additives, etc.). The cathode can comprise between about 1 wt. % and about 95 wt. % active material. Suitable cathode materials 2 can include, but are not limited to, manganese dioxide, copper manganese oxide, hausmannite, manganese oxide, copper intercalated bismuth birnessite, birnessite, todorokite, ramsdellite, pyrolusite, pyrochroite, silver oxide, silver dioxide, silver, nickel oxyhydroxide, nickel hydroxide, nickel, lead oxide, copper oxide, copper dioxide, lead, lead dioxide ($\alpha$ and $\beta$), potassium persulfate, sodium persulfate, ammonium persulfate, potassium permanganate, calcium permanganate, barium permanganate, silver permanganate, ammonium permanganate, peroxide, gold, perchlorate, cobalt oxide ($CoO$, $CoO_2$, $Co_3O_4$), lithium cobalt oxide, sodium cobalt oxide, perchlorate, nickel oxide, bromine, mercury, vanadium oxide, bismuth vanadium oxide, hydroquinone, calix[4]quinone, tetrachlorobenzoquinone, 1,4-naphthoquinone, 9,10-anthraquinone, 1,2-napthaquinone, 9,10-phenanthrenequinone, nitroxide-oxammonium cation redox pair like 2,2,6,6-tetramethylpiperidin-1-yl)oxyl (TEMPO), carbon, 2,3-dicyano-5,6-dichlorodicyanoquinone, tetracyanoethylene, sulfur trioxide, ozone, oxygen, air, lithium nickel manganese cobalt oxide, sulfur, lithium iron phosphate, lithium copper oxide, lithium copper oxyphosphate, or any combination thereof. In some embodiments, the cathode can comprise an air electrode.

In some embodiments, the cathode material 2 can be based on one or many polymorphs of $MnO_2$, including electrolytic manganese dioxide (EMD), $\alpha$-$MnO_2$, $\beta$-$MnO_2$, $\gamma$-$MnO_2$, $\delta$-$MnO_2$, $\epsilon$-$MnO_2$, or $\lambda$-$MnO_2$. Other forms of $MnO_2$ can also be present such as hydrated $MnO_2$, pyrolusite, birnessite, ramsdellite, hollandite, romanechite, todorokite, lithiophorite, chalcophanite, sodium or potassium rich birnessite, cryptomelane, buserite, manganese oxyhydroxide (MnOOH), $\alpha$-MnOOH, $\gamma$-MnOOH, $\beta$-MnOOH, manganese hydroxide [$Mn(OH)_2$], partially or fully protonated manganese dioxide, $Mn_3O_4$, $Mn_2O_3$, bixbyite, MnO, lithiated manganese dioxide ($LiMn_2O_4$, $Li_2MnO_3$), $CuMn_2O_4$, aluminum manganese oxide, zinc manganese dioxide, bismuth manganese oxide, copper intercalated birnessite, copper intercalated bismuth birnessite, tin doped manganese oxide, magnesium manganese oxide, or any combination thereof. In general, the cycled form of manganese dioxide in the cathode can have a layered configuration, which in some embodiments can comprise δ-MnO$_2$ that is interchangeably referred to as birnessite. If non-birnessite polymorphic forms of manganese dioxide are used, these can be converted to birnessite in-situ by one or more conditioning cycles as described in more details below. For example, a full or partial discharge to the end of the MnO$_2$ second electron stage (e.g., between about 20% to about 100% of the $2^{nd}$ electron capacity of the cathode) may be performed and subsequently recharging back to its Mn$^{4+}$ state, resulting in birnessite-phase manganese dioxide.

In some embodiments, the cathode 12 used in the high voltage membraneless MnO$_2$|Zn battery as disclosed herein can contain electroactive materials like metal, metal oxides, metal salts (e.g., metal sulfides), electroactive polymers, electroactive organic compounds, etc. that have electrochemical activity in electrolytes of high proton activity, such as in the catholyte 3. Nonlimiting examples of cathode materials 2 that have electrochemical activity in electrolytes of high proton activity include electrolytic manganese dioxide (EMD), α-MnO$_2$, β-MnO$_2$, γ-MnO$_2$, δ-MnO$_2$, ε-MnO$_2$, λ-MnO$_2$, or any combination thereof. Other forms of MnO$_2$ can also be present in the cathode 12, such as pyrolusite, birnessite, ramsdellite, hollandite, romanechite, todorokite, lithiophorite, chalcophanite, sodium rich birnessite, potassium rich birnessite, cryptomelane, buserite, manganese oxyhydroxide (MnOOH), α-MnOOH, γ-MnOOH, β-MnOOH, manganese hydroxide [Mn(OH)$_2$], partially or fully protonated manganese dioxide, Mn$_3$O$_4$, Mn$_2$O$_3$, bixbyite, MnO, lithiated manganese dioxide (LiMn$_2$O$_4$), CuMn$_2$O$_4$, zinc manganese dioxide, lead oxide, lead, lead dioxide, copper, copper oxide, copper hydroxide, silver, silver oxide, nickel, nickel oxide, nickel hydroxide, nickel oxyhydroxide, cobalt oxide, cobalt, cobalt hydroxide, lithium nickel manganese cobalt oxide, lithium nickel oxide, lithium manganese oxide, lithium cobalt oxide, lithium iron phosphate, potassium iron oxide, barium iron oxide, copper hexacyanoferrate, delithiated manganese oxides, delithiated nickel oxides, delithiated nickel manganese oxides, delithiated nickel manganese cobalt oxides, quinone compounds like calix[4]quinone, 1,4-napththoquinone, 9,10-anthraquinone, vanadium oxide, or any combination thereof. Combinations of electroactive materials can also be employed in the cathode materials 2. The electroactive cathode materials 2 can be in the form of powders of varying particle sizes (nanometers to micrometers) and/or in the form of metallic substrates with planar, mesh or perforated-type architecture.

The addition of a conductive additive such as conductive carbon enables high loadings of an electroactive material in the cathode material, resulting in high volumetric and gravimetric energy density. In some embodiments, the conductive additive can be present in the cathode material 2 in an amount of about 1-30 wt. %, based on the total weight of the cathode material 2. In some embodiments, the conductive additive can comprise graphite, carbon fiber, carbon black, acetylene black, single walled carbon nanotubes, multi-walled carbon nanotubes, nickel or copper coated carbon nanotubes, dispersions of single walled carbon nanotubes, dispersions of multi-walled carbon nanotubes, graphene, graphyne, graphene oxide, or a combination thereof. Higher loadings of the electroactive material in the cathode are, in some embodiments, desirable to increase the energy density. Other examples of conductive carbon include TIMREX Primary Synthetic Graphite (all types), TIMREX Natural Flake Graphite (all types), TIMREX MB, MK, MX, KC, B, LB Grades (examples, KS15, KS44, KC44, MB15, MB25, MK15, MK25, MK44, MX15, MX25, BNB90, LB family) TIMREX Dispersions; ENASCO 150G, 210G, 250G, 260G, 350G, 150P, 250P; SUPER P, SUPER P Li, carbon black (examples include Ketjenblack EC-300J, Ketjenblack EC-600JD, Ketjenblack EC-600JD powder), acetylene black, carbon nanotubes (single or multi-walled), Zenyatta graphite, and/or combinations thereof.

In some embodiments, the conductive additive can have a particle size range from about 1 to about 50 microns, or between about 2 and about 30 microns, or between about 5 and about 15 microns. In an embodiment, the conductive additive can include expanded graphite having a particle size range from about 10 to about 50 microns, or from about 20 to about 30 microns. Carbon fibers and nanotubes can have varying aspect ratios where their diameters can be in the tens to hundreds of nanometers. In some embodiments, the mass ratio of graphite to the conductive additive can range from about 5:1 to about 50:1, or from about 7:1 to about 28:1. The total conductive additive mass percentage (e.g., total carbon mass percentage) in the cathode material 2 (e.g., cathode paste) can range from about 5% to about 99%, or from about 10% to about 80%. In some embodiments, the electroactive component in the cathode material 2 can be between 1 and 99 wt. % of the weight of the cathode material 2, and the conductive additive can be between 1 and 99 wt. % of the weight of the cathode material 2.

In some embodiments, dopants or additives can be added to the cathode material 2, as necessary to enhance rechargeability and performance. The additives can be in the form of powders mixed with the electroactive material or in the form of metallic substrates onto which the electroactive and conductive carbon can be pasted onto. Nonlimiting examples of additives suitable for use in the electrode materials of this disclosure include bismuth, bismuth oxide, copper oxide, copper, indium, indium hydroxide, indium oxide, aluminum, aluminum oxide, nickel, nickel hydroxide, nickel oxide, silver, silver oxide, cobalt, cobalt oxide, cobalt hydroxide, lead, lead oxide, lead dioxide, quinones, salts thereof, derivatives thereof, or any combination thereof. In some embodiments, the dopants or additives can be present in the cathode material 2 in an amount between 0 to 30 wt. %, based on the total weight of the cathode material 2.

In some embodiments, the cathode material 2 can also comprise a conductive component. The addition of a conductive component such as metal additives to the cathode material 2 may be accomplished by addition of one or more metal powders such as nickel powder to the cathode material 2. The conductive metal component can be present in a concentration of between about 0-30 wt. % in the cathode material 2. The conductive metal component may be, for example, nickel, copper, silver, gold, tin, cobalt, antimony, brass, bronze, aluminum, calcium, iron, or platinum. In one embodiment, the conductive metal component is a powder. In some embodiments, the conductive component can be added as an oxide and/or salt. For example, the conductive component can be cobalt oxide, cobalt hydroxide, lead oxide, lead hydroxide, or a combination thereof. In some embodiments, a second conductive metal component is added to act as a supportive conductive backbone for the first and second electron reactions to take place. The second electron reaction has a dissolution-precipitation reaction where Mn$^{3+}$ ions become soluble in the electrolyte and precipitate out on the materials such as graphite resulting in an electrochemical reaction and the formation of manganese hydroxide [Mn(OH)$_2$] which is non-conductive. This ultimately results in a capacity fade in subsequent cycles.

Suitable conductive components that can help to reduce the solubility of the manganese ions include transition metals like Ni, Co, Fe, Ti and metals like Ag, Au, Al, Ca. Oxides and salts of such metals are also suitable. Transition metals like Co can also help in reducing the solubility of $Mn^{3+}$ ions. Such conductive metal components may be incorporated into the electrode by chemical means or by physical means (e.g. ball milling, mortar/pestle, spex mixture). An example of such an electrode comprises 5-95% birnessite, 5-95% conductive carbon, 0-50% conductive component (e.g., a conductive metal), and 1-10% binder.

In some embodiments, a binder can be used with the cathode material 2. The binder can be present in a concentration of between about 0-10 wt. %, or alternatively between about 1-5 wt. % by weight of the cathode material. In some embodiments, the binder comprises water-soluble cellulose-based hydrogels, which can be used as thickeners and strong binders, and have been cross-linked with good mechanical strength and with conductive polymers. The binder may also be a cellulose film sold as cellophane. The binders can be made by physically cross-linking the water-soluble cellulose-based hydrogels with a polymer through repeated cooling and thawing cycles. In some embodiments, the binder can comprise a 0-10 wt. % carboxymethyl cellulose (CMC) solution cross-linked with 0-10 wt. % polyvinyl alcohol (PVA) on an equal volume basis. The binder, compared to the traditionally-used TEFLON® or PTFE (polytetrafluoroethylene), shows superior performance. TEFLON® or PTFE is a very resistive material, but its use in the industry has been widespread due to its good rollable properties. This, however, does not rule out using TEFLON® or PTFE as a binder. Mixtures of TEFLON® or PTFE with the aqueous binder and some conductive carbon can be used to create rollable binders. Using the aqueous-based binder can help in achieving a significant fraction of the two-electron capacity with minimal capacity loss over many cycles. In some embodiments, the binder can be water-based, have superior water retention capabilities, adhesion properties, and help to maintain the conductivity relative to an identical cathode using a PTFE binder instead. Examples of suitable water-based hydrogels can include, but are not limited to, methyl cellulose (MC), carboxymethyl cellulose (CMC), hydroxypropyl cellulose (HPH), hydroxypropylmethyl cellulose (HPMC), hydroxethylmethyl cellulose (HEMC), carboxymethylhydroxyethyl cellulose, hydroxyethyl cellulose (HEC), and combinations thereof. Examples of crosslinking polymers include polyvinyl alcohol, polyvinylacetate, polyaniline, polyvinylpyrrolidone, polyvinylidene fluoride, polypyrrole, and combinations thereof. In some embodiments, a 0-10 wt. % solution of water-based cellulose hydrogel can be cross-linked with a 0-10 wt. % solution of crosslinking polymers by, for example, repeated freeze/thaw cycles, radiation treatment, and/or chemical agents (e.g., epichlorohydrin). The aqueous binder may be mixed with 0-5% PTFE to improve manufacturability.

The cathode material 2 can also comprise additional elements. The additional elements can be included in the cathode material including a bismuth compound and/or copper/copper compounds, which together allow improved galvanostatic battery cycling of the cathode. When present as birnessite, the copper and/or bismuth can be incorporated into the layered nanostructure of the birnessite. The resulting birnessite cathode material can exhibit improved cycling and long-term performance with the copper and bismuth incorporated into the crystal and nanostructure of the birnessite.

The bismuth compound can be incorporated into the cathode 12 as an inorganic or organic salt of bismuth (oxidation states 5, 4, 3, 2, or 1), as a bismuth oxide, or as bismuth metal (i.e., elemental bismuth). The bismuth compound can be present in the cathode material at a concentration between about 1-20 wt. % of the weight of the cathode material 2. Examples of bismuth compounds include bismuth chloride, bismuth bromide, bismuth fluoride, bismuth iodide, bismuth sulfate, bismuth nitrate, bismuth trichloride, bismuth citrate, bismuth telluride, bismuth selenide, bismuth subsalicylate, bismuth neodecanoate, bismuth carbonate, bismuth subgallate, bismuth strontium calcium copper oxide, bismuth acetate, bismuth trifluoromethanesulfonate, bismuth nitrate oxide, bismuth gallate hydrate, bismuth phosphate, bismuth cobalt zinc oxide, bismuth sulphite agar, bismuth oxychloride, bismuth aluminate hydrate, bismuth tungsten oxide, bismuth lead strontium calcium copper oxide, bismuth antimonide, bismuth antimony telluride, bismuth oxide yttria stabilized (e.g., yttria doped bismuth oxide), bismuth-lead alloy, ammonium bismuth citrate, 2-napthol bismuth salt, dichloritri(o-tolyl)bismuth, dichlorodiphenyl(p-tolyl)bismuth, triphenylbismuth, and/or combinations thereof.

The copper compound can be incorporated into the cathode 12 as an organic or inorganic salt of copper (oxidation states 1, 2, 3, or 4), as a copper oxide, or as copper metal (i.e., elemental copper). The copper compound can be present in a concentration between about 1-70 wt. % of the weight of the cathode material 2. In some embodiments, the copper compound is present in a concentration between about 5-50 wt. % of the weight of the cathode material 2. In other embodiments, the copper compound is present in a concentration between about 10-50 wt. % of the weight of the cathode material 2. In yet other embodiments, the copper compound is present in a concentration between about 5-20 wt. % of the weight of the cathode material 2. Examples of copper compounds include copper and copper salts such as copper aluminum oxide, copper (I) oxide, copper (II) oxide and/or copper salts in a +1, +2, +3, or +4 oxidation state including, but not limited to, copper nitrate, copper sulfate, copper chloride, etc. The effect of copper is to alter the oxidation and reduction voltages of bismuth. This results in a cathode with full reversibility during galvanostatic cycling, as compared to a bismuth-modified $MnO_2$ which cannot withstand galvanostatic cycling as well.

The cathodes 12 can be produced using methods implementable in large-scale manufacturing. For a $MnO_2$ cathode, the cathode 12 can be capable of delivering the full second electron capacity of the $MnO_2$. In some embodiments, the cathode material 2 can comprises 2-30 wt. % conductive carbon, 0-30 wt. % conductive metal additive, 1-70 wt. % copper compound, 1-20 wt. % bismuth compound, 0-10 wt. % binder and birnessite or EMD. In another embodiment, the cathode material 2 comprises 2-30 wt. % conductive carbon, 0-30 wt. % conductive metal additive, 1-20% wt. bismuth compound, 0-10 wt. % binder and birnessite or EMD. In one embodiment, the cathode material 2 consists essentially of 2-30 wt. % conductive carbon, 0-30 wt. % conductive metal additive, 1-70 wt. % copper compound, 1-20 wt. % bismuth compound, 0-10 wt. % binder, and the balance is birnessite or EMD. In another embodiment, the cathode material 2 consists essentially of 2-30 wt. % conductive carbon, 0-30 wt. % conductive metal additive, 1-20 wt. % bismuth compound, 0-10 wt. % binder, and the balance is birnessite or EMD.

The resulting cathode may have a porosity in the range of 20%-85% as determined by mercury infiltration porosimetry. The porosity can be measured according to ASTM D4284-12 "Standard Test Method for Determining Pore Volume Distribution of Catalysts and Catalyst Carriers by Mercury Intrusion Porosimetry" using the version as of the date of the filing of this application.

The cathode material 2 can be formed on a cathode current collector 1 formed from a conductive material that serves as an electrical connection between the cathode material and an external electrical connection or connections. In some embodiments, the cathode current collector 1 can be, for example, carbon, lead, nickel, steel (e.g., stainless steel, etc.), nickel-coated steel, nickel plated copper, tin-coated steel, copper plated nickel, silver coated copper, copper, magnesium, aluminum, tin, iron, platinum, silver, gold, titanium, bismuth, half nickel and half copper, or any combination thereof. In some embodiments, the current collector 1 can comprise a carbon felt, carbon foam, a conductive polymer mesh, or any combination thereof. The cathode current collector may be formed into a mesh (e.g., an expanded mesh, woven mesh, etc.), perforated metal, foam, foil, felt, fibrous architecture, porous block architecture, perforated foil, wire screen, a wrapped assembly, or any combination thereof. In some embodiments, the current collector can be formed into or form a part of a pocket assembly, wherein the pocket can hold the cathode material 2 within the current collector 1. A tab (e.g., a portion of the cathode current collector 1 extending outside of the cathode material 2 as shown at the top of the cathode 12 in FIG. 1B) can be coupled to the current collector to provide an electrical connection between an external source and the current collector.

The cathode material 2 can be pressed onto the cathode current collector 1 to form the cathode 12. For example, the cathode material 2 can be adhered to the cathode current collector 1 by pressing at, for example, a pressure between 1,000 psi and 20,000 psi (between $6.9 \times 10^6$ and $1.4 \times 10^8$ Pascals). The cathode material 2 may be adhered to the cathode current collector 1 as a paste. The resulting cathode 12 can have a thickness of between about 0.1 mm to about 5 mm.

In some embodiments, the anode material 5 can comprise an electroactive material, which can be Zn. Zn can exist in powder form or as a metallic structure in the anode material 5. The Zn powder can be of varying sizes ranging from nanometers to microns. The Zn metallic structure can be a foil, mesh, perforated foil, foam, sponge-type, or any combination thereof.

While the current disclosure is discussed in detail in the context of a Zn anode, it should be understood that other anode electroactive materials (e.g., metals other than Zn) can be used to form a high voltage aqueous metal-anode battery. For example, the use of the electrolytes having different properties as described herein can allow for a variety of anode materials to be used. In some embodiments, the anode can comprise zinc (Zn), aluminum (Al), magnesium (Mg), iron (Fe), iron oxide ($Fe_2O_3$, $Fe_3O_4$), calcium, strontium, lanthanum, potassium, sodium, zirconium, titanium, titanium oxide, indium (In), indium oxide, indium hydroxide, zinc oxide, manganese oxide ($Mn_2O_3$, $Mn_3O_4$), manganese dioxide ($MnO_2$), hetaerolite ($ZnMn_2O_4$), vanadium, tin, tin oxide, barium hydroxide, barium, cesium, aluminum hydroxide, copper (Cu), copper oxide ($CuO$, $Cu_2O$), bismuth (Bi), silicon, carbon and a mixture of any of these materials. The cells as described herein can be formed by pairing of any of the cathode materials described herein and any of the anode materials as described to the extent that the materials mentioned above to generate a voltage in the presence of suitable electrolytes (e.g., a suitable anolyte and catholyte, etc.). The anode active material can exist in powder form or as a metallic structure. The powder can be of varying sizes ranging from nanometers to microns. The metallic structure can be a foil, mesh, perforated foil, foam, sponge-type, or any combination thereof.

In some embodiments, the anode material 5 can comprise zinc, which can be present as elemental zinc and/or zinc oxide. In some embodiments, the Zn anode mixture comprises Zn, zinc oxide (ZnO), an electronically conductive material, and a binder. The Zn may be present in the anode material 5 in an amount of from about 50 wt. % to about 90 wt. %, alternatively from about 60 wt. % to about 80 wt. %, or alternatively from about 65 wt. % to about 75 wt. %, based on the total weight of the anode material. Additional elements that can be in the anode in addition to the zinc or in place of the zinc include, but are not limited to, lithium, aluminum, magnesium, iron, cadmium and a combination thereof, where each element can be present in amounts that are the same or similar to that of the zinc described herein.

In some embodiments, the anode material 5 can comprise zinc oxide (ZnO), which can be formed into Zn by a charging step in situ during battery operation. In some embodiments, the anode material 5 can comprise ZnO in an amount of from about 5 wt. % to about 20 wt. %, alternatively from about 5 wt. % to about 15 wt. %, or alternatively from about 5 wt. % to about 10 wt. %, based on the total weight of anode material. As will be appreciated by one of skill in the art, and with the help of this disclosure, the purpose of the ZnO in the anode mixture is to provide a source of Zn during the recharging steps, and the zinc present can be converted between zinc and zinc oxide during charging and discharging phases.

In an embodiment, an electrically conductive material may be optionally present in the anode material in an amount of from about 5 wt. % to about 20 wt. %, alternatively from about 5 wt. % to about 15 wt. %, or alternatively from about 5 wt. % to about 10 wt. %, based on the total weight of the anode material. As will be appreciated by one of skill in the art, and with the help of this disclosure, the electrically conductive material can be used in the anode mixture as a conducting agent, e.g., to enhance the overall electric conductivity of the anode mixture. Non-limiting examples of electrically conductive material suitable for use can include any of the conductive carbons described herein such as carbon, graphite, graphite powder, graphite powder flakes, graphite powder spheroids, carbon black, activated carbon, conductive carbon, amorphous carbon, glassy carbon, and the like, or combinations thereof. The conductive material can also comprise any of the conductive carbon materials described with respect to the cathode material including, but not limited to, acetylene black, single walled carbon nanotubes, multi-walled carbon nanotubes, graphene, graphyne, or any combinations thereof. In some embodiments, the electrically conductive material used in the anode mixture can comprise a metallic conductive powder, wherein the metallic conductive powder comprises copper, bismuth, indium, nickel, silver, tin, etc., or any combination thereof.

In some embodiments, the anode material 5 can contain additives that enhance electrochemical activity and reduce gassing of the electrolyte. Nonlimiting examples of such additives can include bismuth, bismuth oxide, indium, indium oxide, indium hydroxide, cetyltrimethylammonium bromide, sodium dodecyl sulfate, sodium dodecylbenzene sulfonate, polyethylene glycol, zinc oxide, or any combination thereof.

The anode material 5 may also comprise a binder. Generally, a binder functions to hold the electroactive material particles together and in contact with the current collector. The binder can be present in a concentration of 0-10 wt. %. The binders in the anode material 5 can also comprise any of the binders described herein with respect to the cathode material. The binders may comprise water-soluble cellulose-based hydrogels like methyl cellulose (MC), carboxymethyl cellulose (CMC), hydroxypropyl cellulose (HPH), hydroxypropylmethyl cellulose (HPMC), hydroxethylmethyl cellulose (HEMC), carboxymethylhydroxyethyl cellulose and hydroxyethyl cellulose (HEC), which can be used as thickeners and strong binders, and have been cross-linked with good mechanical strength and with conductive polymers like polyvinyl alcohol, polyvinylacetate, polyaniline, polyvinylpyrrolidone, polyvinylidene fluoride and polypyrrole. The binder may also be a cellulose film sold as cellophane. The binder may also be PTFE, which is a very resistive material, but its use in the industry has been widespread due to its good rollable properties. In some embodiments, the binder may be present in the anode material in an amount of from about 2 wt. % to about 10 wt. %, alternatively from about 2 wt. % to about 7 wt. %, or alternatively from about 4 wt. % to about 6 wt. %, based on the total weight of the anode material.

In some embodiments, the anode material 5 can be used by itself without a separate anode current collector 4, though a tab or other electrical connection can still be provided to the anode material 5. In this embodiment, the anode material may have the form or architecture of a foil, a mesh, a perforated layer, a foam, a felt, or a powder. For example, the anode can comprise a metal foil electrode, a mesh electrode, or a perforated metal foil electrode.

In some embodiments, the anode 13 can comprise an optional anode current collector 4. The anode current collector 4 can be used with an anode 13, including any of those described with respect to the cathode 12. The anode material 5 can be pressed onto the anode current collector 4 to form the anode 13. For example, the anode material 5 can be adhered to the anode current collector 4 by pressing at, for example, a pressure between 1,000 psi and 20,000 psi (between $6.9 \times 10^6$ and $1.4 \times 10^8$ Pascals). The anode material 5 may be adhered to the anode current collector 4 as a paste. A tab of the anode current collector 4, when present, can extend outside of the device to form the current collector tab. The resulting anode 13 can have a thickness of between about 0.1 mm to about 5 mm.

In some embodiments, the cathode material and the anode material with their corresponding electroactive materials can also be formed from dissolved salts in the corresponding electrolytes (e.g., catholyte and anolyte, respectively). The process of forming the cathode material and the anode material from dissolved salts in the corresponding electrolytes would involve a charging step or a formation step, where the dissolved salts containing the active ions are plated onto the current collector by electrons flowing from an outside circuit. For example, manganese salts like manganese sulfate, manganese triflate, etc. in electrolytes with high proton activity will electroplate $MnO_2$ during the charging or formation step. Similarly, zinc oxide dissolved into the anolyte will form Zn during the charging or formation step.

As disclosed herein, the battery 10 comprises a separator 9, wherein the separator 9 comprises one or more buffer interlayers. The separator 9 excludes a membrane, such as an ion-exchange membrane and/or a bipolar membrane. The ability to form the battery 10 without a membrane may allow for the overall cost of the battery to be reduced while having the same or better performance when compared to the performance of a battery with a membrane. The use of a polymer gelled electrolyte (PGE) for the catholyte and the anolyte can serve the function of the separator 9 by forming a physical barrier between the anode 13 and the cathode 12 to prevent short circuiting, for example as shown in FIG. 1B. However, the use of a buffer interlayer may enhance the performance of the battery.

In some embodiments, a separator 9 (e.g., as shown in FIGS. 1A and 1C), such as one or more buffer interlayers, can be disposed between the anode 13 and the cathode 12 when the electrodes are constructed into the battery. While shown as being disposed between the anode 13 and the cathode 12, the separator 9 can be used to wrap one or more of the anode 13 and/or the cathode 12, or alternatively one or more anodes 13 and/or cathodes 12 when multiple anodes 13 and cathodes 12 are present.

The separator 9 may comprise one or more buffer interlayers, as described in more detail below. For example, in some embodiments, when the separator is used, between 1 to 5 layers of the separator can be applied between adjacent electrodes.

When a buffer interlayer is used, the buffer interlayer can comprise a gelled solution that can comprise the same electrolyte formulation as the anolyte and/or the catholyte. For example, the buffer interlayer can be a PGE as described herein. One or more additives can also be present in the buffer layer such as calcium hydroxide, layered double hydroxides like hydrotalcites, quintinite, fougerite, magnesium hydroxide, or combinations thereof. For example, when the anolyte and catholyte have substantially the same formulation, only with different proton and hydroxyl anion compositions and/or viscosities, the buffer interlayer can have a concentration of the electrolyte that is the same as the anolyte or catholyte, or have a concentration that is between that of the anolyte and the catholyte. The buffer interlayer can have a viscosity greater than that of either the anolyte or catholyte to help prevent mixing between the anolyte and catholyte as well as limiting the migration of ions between the anolyte and catholyte.

As shown in FIGS. 1A-1D, a catholyte 3 can be in contact with the cathode 12, and an anolyte 6 can be in contact with the anode 13. As described in more detail herein, one or both of the catholyte 3 and/or the anolyte 6 can be polymerized or gelled to form separate gelled electrolytes to prevent mixing between the two electrolyte solutions. The catholyte 3 can be disposed in the housing 10 in contact with the cathode material 2. In some embodiments, the anolyte 6 can be polymerized or gelled, and the catholyte 3 can be a liquid. The polymerization of the anolyte 6 can prevent mixing between the catholyte 3 and the anolyte 6 even when the catholyte 3 is a liquid. In some embodiments, both the catholyte 3 and the anolyte 6 are gelled.

The electrolyte on the cathode side (e.g., catholyte 3) has a relatively high proton activity, which dictates the potential of the battery. The higher the activity of the protons in the catholyte, the higher the potential of the battery. An acid dissociation constant ($K_a$) is a relatively good indicator for judging proton activity. Nonlimiting examples of acidic electrolytes or ions having low to very large $K_a$'s suitable for use in the catholyte 3 include hydrogen phosphate, bicarbonates, ammonium cation, hydrogen sulfide, acetic acid, hydrogen fluoride, phosphoric acid, sulfuric acid, nitric acid, hydrochloric acid, hydrogen bromide, hydroiodic acid, triflic acid, or any combination thereof. Triflic acids are superacids with high proton activity and use of these acids can help boost battery potential significantly.

The catholyte 3 can be an acidic solution, wherein the pH of the catholyte can be less than about 4, alternatively less than about 3, alternatively less than about 2, alternatively less than about 1, alternatively between −1.2 and 4, alternatively between −1.2 and 3, alternatively between −1.2 and 2, or alternatively between −1.2 and 1. The catholyte 3 can be used in conditions having temperatures ranging between 0 and 200° C. In some embodiments, the catholyte can comprise an acid such as a mineral acid (e.g., hydrochloric acid, nitric acid, sulfuric acid, etc.). For acid catholyte compositions, the acid concentration (e.g., concentration of the acidic electrolyte) can be between about 0.0001 M and about 16 M, alternatively from about 0.001 M to about 16 M, alternatively from about 0.01 M to about 16 M, alternatively from about 0.1 M to about 16 M, or alternatively from about 1 M to about 16 M.

In some embodiments, the hydrogen activity of the catholyte 3 can be altered by using acids of different strengths. $K_a$ is a relatively good indicator for judging acid strengths. The following electrolytes or ions having low to very large $K_a$'s can be used in the catholyte solution: hydrogen phosphate, bicarbonates, ammonium cation, hydrogen sulfide, acetic acid, hydrogen fluoride, phosphoric acid, sulfuric acid, nitric acid, hydrochloric acid, hydrogen bromide, hydroiodic acid, triflic acid, or any combination thereof. While these examples of acidic electrolytes can help alter hydrogen (or proton) activity, it should be apparent to anyone skilled in chemistry or electrochemistry that any combination of acidic electrolytes and other electrolytes can be used to alter proton activity.

Catholyte additives can help with boosting the performance of the cathode material. Nonlimiting examples of catholyte additives suitable for use in this disclosure include manganese sulfate, nickel sulfate, potassium permanganate, manganese chloride, manganese acetate, manganese triflate, bismuth chloride, bismuth nitrate, manganese nitrate, nickel sulfate, nickel nitrate, zinc sulfate, zinc chloride, zinc acetate, zinc triflate, indium chloride, copper sulfate, copper chloride, lead sulfate, sodium persulfate, potassium persulfate, ammonium persulfate, ammonium chloride, vanillin, potassium chloride, sodium chloride, lithium nitrate, lithium chloride, lithium carbonate, lithium acetate, lithium triflate, aluminum trifluoromethanesulfonate, aluminum chloride, aluminum nitrate, potassium sulfate, sodium sulfate, ammonium sulfate, or any combination thereof. The concentration of catholyte additives can be between 0 and 5 M.

In some embodiments, the catholyte solution can comprise a solution comprising potassium permanganate, sodium permanganate, lithium permanganate, calcium permanganate, manganese sulfate, manganese chloride, manganese nitrate, manganese perchlorate, manganese acetate, manganese bis(trifluoromethanesulfonate), manganese triflate, manganese carbonate, manganese oxalate, manganese fluorosilicate, manganese ferrocyanide, manganese bromide, magnesium sulfate, ammonium chloride, ammonium sulfate, ammonium hydroxide, zinc sulfate, zinc triflate, zinc acetate, zinc nitrate, bismuth chloride, bismuth nitrate, nitric acid, sulfuric acid, hydrochloric acid, sodium sulfate, potassium sulfate, cobalt sulfate, lead sulfate, sodium hydroxide, potassium hydroxide, titanium sulfate, titanium chloride, lithium nitrate, lithium chloride, lithium bromide, lithium bicarbonate, lithium acetate, lithium sulfate, lithium nitrate, lithium nitrite, lithium hydroxide, lithium perchlorate, lithium oxalate, lithium fluoride, lithium carbonate, lithium sulfate, lithium bromate, polyvinyl alcohol, carboxymethyl cellulose, xanthum gum, carrageenan, acrylamide, potassium persulfate, sodium persulfate, ammonium persulfate, N,N'-methylenebisacrylamide, or any combination thereof. For example, the catholyte solution can comprise manganese sulfate mixed with sulfuric acid or potassium permanganate mixed with sulfuric acid. Other dopants to this solution can be zinc sulfate, lead sulfate, titanium disulfide, titanium sulfate hydrate, silver sulfate, cobalt sulfate, and nickel sulfate. In some embodiments, the catholyte solution can comprise manganese sulfate, ammonium chloride, ammonium sulfate, manganese acetate, potassium permanganate, and/or a salt of permanganate, where the additives can have a concentration between 0 and 10 M. Depending on the type of manganese salts used voltage of the battery system can be different. For example, in manganese sulfate electrolyte the voltage of the SS-HiVAB is around 2.45-2.5V, while in potassium permanganate electrolyte the voltage of the SS-HiVAB is around 2.8-2.9V.

In some embodiments, the catholyte can comprise a permanganate. Permanganates have a high positive potential. This can allow the overall cell potential to be increased within the battery 10. When present, the permanganate can be present in a molar ratio of an acid (e.g., a mineral acid such a hydrochloric acid, sulfuric acid, etc.) to permanganate of between about 5:1 to about 1:5, or about 1:1 to about 1:6, or between about 1:2 to about 1:4, or about 1:3, though the exact amount can vary based on the expected operation conditions of the battery 10. The concentration of the permanganate (e.g., potassium permanganate or a salt of permanganate, etc.) can be greater than 0 and less than or equal to 5 M. In some embodiments, the catholyte solution comprises sulfuric acid, hydrochloric acid or nitric acid at a concentration greater than 0.0001 M and less than or equal to 16 M. The use of a permanganate can be advantageous for creating a high voltage battery such that when the use of a catholyte with permanganates is combined with a very negative anode potential, the resulting battery can have a voltage of approximately 2.8 V when the cathode and anode are MnO$_2$|Zn and a voltage of approximately 4 V when the cathode and anode are MnO$_2$|Al. When the catholyte comprises a permanganate, suitable permanganates can include, but are not limited to, potassium permanganate, sodium permanganate, lithium permanganate, calcium permanganate, and combinations thereof.

The electrolyte on the anode side (e.g., anolyte 6) has a relatively high hydroxyl activity, which dictates the potential of the battery. The higher the activity of the hydroxyl in the anolyte, the higher the potential of the battery. Nonlimiting examples of alkaline electrolytes or ions having relatively high hydroxyl activity suitable for use in the anolyte 6 include ammonia, methylamine, glycine, lithium hydroxide, sodium hydroxide, potassium hydroxide, caesium hydroxide, rubidium hydroxide, calcium hydroxide, strontium hydroxide, barium hydroxide, or any combination thereof.

In some embodiments, the anolyte can be an alkaline electrolyte (e.g., a relatively highly alkaline electrolyte), while the catholyte can be an acidic solution (e.g., a relatively highly acidic solution). The alkaline electrolyte in the anolyte can be a hydroxide such as potassium hydroxide, sodium hydroxide, lithium hydroxide, ammonium hydroxide, cesium hydroxide, or any combination thereof. The resulting anolyte can have a pH of equal to or greater than 10, alternatively equal to or greater than 11, or alternatively equal to or greater than 12, or alternatively equal to or greater than 13. In some embodiments, the pH of the anolyte can be greater than or equal to about 10 and less than or equal to about 15.13, alternatively greater than or equal to about 11 and less than or equal to about 15.13, alternatively greater than or equal to about 12 and less than or equal to about 15.13, or alternatively greater than or equal to about 13 and less than or equal to about 15.13. As described herein, the anolyte can be polymerized or gelled. The resulting anolyte can be in a semi-solid state that resists flowing within the battery. This can serve to limit or prevent any mixing between the anolyte and the catholyte. The anolyte can be polymerized using any suitable techniques, including any of those described herein. In some embodiments, the alkaline electrolyte can be present in the anolyte in an amount of 1-70 wt. %, alternatively 1-25 wt. %, alternatively 25-70 wt. %, alternatively 20-60 wt. %, alternatively 20-55 wt. %, alternatively 30-55 wt. %, or alternatively 1-55 wt. %, based on the total weight of the anolyte. Usually a higher concentration of alkaline electrolyte is used to increase the solubility of any metals in the gelled state in the anolyte. For example, the higher concentration of alkaline electrolyte can be between 25-70 wt. % of the anolyte.

In some embodiments, the hydroxyl activity of the anolyte 6 can be altered by using bases of different strengths, where the following from low to high strength can be used: ammonia, methylamine, glycine, lithium hydroxide, sodium hydroxide, potassium hydroxide, caesium hydroxide, rubidium hydroxide, calcium hydroxide, strontium hydroxide, barium hydroxide, or any combination thereof. While these examples of alkaline electrolytes can help alter hydroxyl activity, it should be apparent to anyone skilled in chemistry or electrochemistry that any combination of alkaline electrolytes and other electrolytes can be used to alter hydroxyl activity.

In addition to a hydroxide, the anolyte 6 can comprise additional components. In some embodiments, the alkaline electrolyte can have zinc oxide, potassium carbonate, potassium iodide and potassium fluoride as additives. When zinc compounds are present in the anolyte, the anolyte can comprise zinc sulfate, zinc chloride, zinc acetate, zinc carbonate, zinc chlorate, zinc fluoride, zinc formate, zinc nitrate, zinc oxalate, zinc sulfite, zinc tartrate, zinc cyanide, zinc oxide, sodium hydroxide, potassium hydroxide, lithium hydroxide, potassium chloride, sodium chloride, potassium fluoride, lithium nitrate, lithium chloride, lithium bromide, lithium bicarbonate, lithium acetate, lithium sulfate, lithium permanganate, lithium nitrate, lithium nitrite, lithium perchlorate, lithium oxalate, lithium fluoride, lithium carbonate, lithium bromate, acrylic acid, N,N'-methylenebisacrylamide, potassium persulfate, ammonium persulfate, sodium persulfate, or a combination thereof.

In some embodiments, the anolyte 6 can comprise electrolyte additives (e.g., anolyte additives), such as vanillin, indium hydroxide, zinc acetate, zinc oxide, cetyltrimethylammonium bromide, sodium dodecyl sulfate, sodium dodecylbenzene sulfonate, polyethylene glycol, ethanol, methanol, zinc gluconate, glucose, or any combination thereof.

In some embodiments, an organic solvent containing a suitable salt can be used as an electrolyte. Examples of suitable organic solvents include, but are not limited to, cyclic carbonates, linear carbonates, dialkyl carbonates, aliphatic carboxylate esters, γ-lactones, linear ethers, cyclic ethers, aprotic organic solvents, fluorinated carboxylate esters, and combinations thereof. Any suitable additives including salts as described herein can be used with the organic solvents to form an organic electrolyte for the anolyte and/or catholyte.

In some embodiments, an ionic liquid can be used to form a gelled electrolyte (e.g., a gelled anolyte, a gelled catholyte, etc.). The ionic liquids can comprise 1-ethyl-3-methylimidazolium chloride (EMImCl), 1-allyl-3-methylimidazolium bromide, 1-allyl-3-methylimidazolium chloride, 1-butyl-2, 3-dimethylimidazolium chloride, 1-ethyl-3-methylimidazolium acetate, 1-ethyl-3-methylimidazolium bromide, 1-ethyl-3-methylimidazolium tetrachloroaluminate, lithium hexafluorophosphate (LiPF$_6$), lithium perchlorate, lithium bis(trifluoromethanesulfonyl)imide, lithium bis(oxalato)borate, and combinations thereof. Other ionic liquids are known and can also be used. In some embodiments, EMImCl can be used as the ionic liquid and can be purified before mixing with an aluminum salt to form an aluminum-ion conducting electrolytes. The aluminum salt can be aluminum chloride, aluminum acetate, aluminum nitrate, aluminum bromide, and others. The mixture of EMImCl with aluminum chloride can be made by slowly adding a precise amount of aluminum chloride in an inert atmosphere. The mixing ratio of aluminum chloride with EMImCl can be between 5:1 to 1:1, or about 1.5:1.

In some embodiments, a water in salt electrolyte can be gelled and used as the catholyte and/or anolyte. A water in salt electrolyte can include an electrolyte in which the salt concentration is above the saturation point. The activity of water in an aqueous electrolyte can be further reduced by increasing the salt concentration above the saturation point in order to form a water in salt electrolyte. The ionic conductivity of such electrolytes can be higher than those in a regular aqueous electrolyte. A water in salt electrolyte can comprise water along with a suitable salt above its saturation point, including any of the salts and additives described herein with regard to the aqueous anolyte and/or catholyte.

The anolyte and the catholyte need to be kept separated or decoupled so that neutralization does not take place. Such separation can be achieved by using a separator, through gelation or polymerization of the electrolytes, and any combination thereof.

One or both of the anolyte and the catholyte can be gelled in the battery. The polymerization process can be performed with any electrolyte, including any of those described herein (e.g., organic, aqueous, ionic liquid, water in salt, etc.). A number of polymerization techniques can be used to form the gelled/solid electrolyte—for example, step-growth, chain-growth, emulsion polymerization, solution polymerization, suspension polymerization, precipitation polymerization, photopolymerization and others. Once the gelled/solid electrolytes are formed through the polymerization step, they can be combined in a single battery housing as described herein. The battery can use separators or be membrane-less or separator-less.

As described herein, the electrolyte can be polymerized or gelled to form a polymer gel electrolyte (PGE) for the catholyte and/or the anolyte. The resulting PGE can be in a semi-solid state that resists flowing within the battery. For example, the PGE can comprise an inert hydrophilic polymer matrix impregnated with aqueous electrolyte. The electrolyte can be polymerized using any suitable techniques. In an embodiment, a method of forming a PGE can begin with selecting a monomer material for the PGE. The monomer can be a polar vinyl monomer selected from the group consisting of acrylic acid, vinyl acetate, acrylate esters, vinyl isocyanate, acrylonitrile, or any combinations thereof. The aqueous electrolyte component can then be selected, and can include any of the components described above with respect to the electrolyte. An initiator can be added to start the polymerization process. In some embodiments, a cross-linker can be used in the electrolyte composition to further cross-link the polymer matrix in order to form the PGE. The monomer in the composition (e.g., a polar vinyl monomer) can be present in an amount of between about 5% to about 50% by weight, the initiator can be present in an amount of between about 0.001 wt. % to about 0.1 wt. %, and the cross-linker can be present in an amount of between 0 to 5 wt. %.

In some embodiments, the PGE can be formed in-situ, which refers to the introduction of the electrolyte as a liquid into the housing followed by subsequent polymerization to form the PGE within the housing. This method can allow the electrolyte composition to soak into the void spaces, the anode, and/or the cathode prior to fully polymerizing to form the PGE. In some embodiments, a vacuum (e.g., a pressure less than atmospheric pressure) can be created within the housing 7 upon introduction of the electrolyte into the corresponding compartment. The vacuum can serve to remove air and allow the electrolyte to penetrate the anode 13, the cathode 12, and/or the various void spaces within the battery 10. In some embodiments, the vacuum can be between about 10 and 29.9 inches of mercury or between about 20 and about 29.9 inches of mercury vacuum. The use of the vacuum can help to avoid the presence of air pockets within the battery 10 prior to the full polymerization of the electrolyte. In some embodiments, the electrodes can be soaked in the electrolyte solution for between 1-120 minutes at a temperature of between 0° C. to 30° C. prior to full polymerization of the electrolyte to allow the electrolyte to impregnate the electrodes. Once the electrolyte is polymerized, the battery can be allowed to rest prior to use. In some embodiments, the battery can be allowed to rest for between 5 minutes and 24 hours.

In order to help impregnate the electrodes with the electrolyte, the electrodes can be pre-soaked with the selected electrolyte solution prior to polymerizing the electrolyte. This can be performed by soaking the electrodes in the electrolyte (e.g., in a catholyte or anolyte separately) outside of the battery or housing, and then placing the pre-soaked electrodes into the housing to construct the battery. In some embodiments, an electrolyte that does not contain a polymer or gelling agent can be introduced into the battery to soak the electrodes in-situ. This can include the use of a vacuum to assist in impregnating the electrodes. The electrodes can be soaked for between about 1 minute and 24 hours. In some embodiments, the soaking can be carried out over a plurality of cycles in which the battery is filled with the electrolyte and allowed to soak, drained, refilled and allowed to soak, followed by draining a desired number of times. Once the electrodes are soaked and impregnated with the electrolyte, the electrolyte containing the polymer and polymerization agents (e.g., an initiator, cross-linking agent, etc.) can be introduced into the housing and allowed to polymerize to form the final battery.

The composition of the electrolyte, the monomer material, the initiator, and the conditions of the formation (e.g., temperature, etc.) can be selected to provide a desired polymerization time to allow the electrolyte composition to properly soak the components of the batter to absorb and penetrate into the electrodes. The temperature can be controlled to control the polymerization process, where relatively colder temperatures can inhibit or slow the polymerization, and relatively warmer temperatures can decrease the polymerization time or accelerate the polymerization process. In addition, an increase in an alkaline electrolyte component (e.g., a hydroxide) can decrease the polymerization time, and an increase in the initiator concentration will decrease the polymerization time. Suitable polymerization times can be between 1 minute and 24 hours, based on the composition of the electrolyte solution and the temperature of the reaction.

In some embodiments, the anolyte and/or the catholyte can be formed via a gelation process, such as a free radical polymerization technique, wherein acrylic acid can be used as the monomer, for example. Acrylic acid can be mixed with either the anolyte or catholyte until it is substantially dissolved. A cross-linker like N,N'-methylenebisacrylamide (MBA) can be used to increase the strength of the polymer. For the anolyte, the process of mixing the acrylic acid with the MBA can be usually done at relatively cold temperatures because of the heat generated in the reaction. However, for the catholyte, the mixture of acrylic acid and MBA can be heated between 50-200° C. The polymerization can be initiated through the addition of an initiator like a persulfate salt, such as potassium persulfate, sodium persulfate, ammonium persulfate, or any combination thereof. The electrolyte additives (e.g., anolyte additive, catholyte additive) can be included during the gelation process. Potassium or sodium acrylate can also be used as the monomer source for gelation of the electrolyte instead of acrylic acid. Polyamides can also be used as a gelling agent. Polyvinyl alcohol (PVA) can also be used as a gelling agent for electrolytes containing permanganates as the electrolyte additives. PVA and permanganates can form stable gels. The electrolyte gels can also be cross-linked with crosslinking agents like glutaraldehyde. Ionomers can also be added during the gelation process. Nonlimiting examples of ionomers that can be added to the electrolyte during the gelation process include Nafion solutions which are made from perfluorosulfonic acid (PFSA)/polytetrafluoroethylene (PTFE) copolymer in the acid form or anion exchange ionomers with polyaromatic polymer.

As an example of a polymerization process, a mixture of acrylic acid, N,N'-methylenebisacrylamide, and alkaline solution can be created at a temperature of around 0° C. Any additives can then be added to the solution (e.g., gassing inhibitors, additional additives as described herein, etc.). For example, zinc oxide, when used in the electrolyte, can be dissolved in the alkaline solution after mixing the precursor components, where the zinc oxide can beneficial during the electrochemical cycling of the anode. To polymerize the resulting mixture an initiator such as potassium persulfate can be added to initiate the polymerization process and form a solid or semi-solid polymerized electrolyte (e.g., a PGE). The resulting polymerized electrolyte can be stable over time once the polymerization process has occurred.

As an example, a PGE described herein can be made through a free radical polymerization process. In an embodiment, acrylic acid (AA) can be used as a monomer with N,N'-methylenebisacrylamide (MBA) as the cross-linker and potassium persulfate ($K_2S_2O_8$) as the initiator. When preparing the anolyte, an alkaline electrolyte such as KOH can be added to this process, which can be embedded in the anolyte gel/polymer framework. The addition of alkaline electrolyte to AA results in neutralization, which reduces the concentration of the alkaline electrolyte in the polymeric gel. Differing alkaline electrolyte concentrations can alter the gelation time. Higher alkaline electrolyte concentrations usually result in faster gelation, while lower alkaline electrolyte concentrations take longer times. Further, initiator concentration can affect the gelation process. Furthermore, the viscosity of the gel can be tuned by altering the monomer and MBA concentration, which can also affect ionic conductivity. Similarly, when preparing the catholyte, an acidic electrolyte such as sulfuric acid can be added to this process, which can be embedded in the catholyte gel/polymer framework.

In some embodiments, an ionomer gelation layer can also be made, wherein the ionomer gelation layer can separate the catholyte and anolyte solutions or gels. The gelation process for forming the ionomer gelation layer is substantially similar to the gelation process of forming the anolyte and/or catholyte gels as described herein, wherein the ionomers are added to the electrolyte during the gelation process. The ionomer gels (e.g., ionomer gelation layers) can also contain additives such as potassium sulfate, sodium sulfate, ammonium sulfate, or any combination thereof. Ionomer resins can also be used in the gelation process to produce an ionomer gelation layer.

The polymerization process can occur prior to the construction of the battery 10 or after the cell is constructed. In some embodiments, the electrolyte can be polymerized and placed into a tray to form a sheet. Once polymerized, the sheet can be cut into a suitable size and shape and one or more layers can be used to form the electrolyte in contact with the corresponding electrode. When a pre-formed PGE is used, additional liquid electrolyte can be introduced into the battery and/or the electrodes can be pre-soaked with the electrolyte prior to constructing the battery.

In some embodiments, the PGE can be formed using an aqueous electrolyte, organic electrolyte, ionic liquid, water in salt electrolyte, and the like. In some embodiments, an aqueous electrolyte can be used for the catholyte and/or anolyte and gelled to form an aqueous hydrogel as the PGE. In some embodiments, aqueous hydrogels can be made through a free radical polymerization process. For example, when preparing the anolyte, acrylic acid (AA) can be selected as the monomer with N,N'-methylenebisacrylamide (MBA) as the cross-linker and potassium persulfate as the initiator. In aqueous alkaline anolytes, a suitable hydroxide (e.g., potassium hydroxide (KOH), sodium hydroxide, lithium hydroxide, etc.) can be used to form the electrolyte. The hydroxide can be encapsulated in a hydrogel network by neutralizing the hydroxide with the AA. To create a hydrogel, the monomer can be combined with any cross-linker until the cross-linker is dissolved. Separately, an amount of the hydroxide can be cooled to slow the reaction. In some embodiments in which the anolyte is an aqueous electrolyte, the hydroxide can be cooled to a temperature below about 10° C., below about 5° C., or below about 0° C. The mixed solution of the monomer and any cross-linker can then be added drop-wise to the chilled solution of the hydroxide as the neutralization reaction releases heat. To gel the resulting mixture of the hydroxide, monomer, and cross-linker, an initiator such as potassium persulfate can be added. The mixture can then be allowed to form a PGE. The amounts and concentrations of the ingredients can be varied to obtain varying mechanical strengths of the hydrogels. Similarly, when preparing the catholyte, an acidic electrolyte such as sulfuric acid can be encapsulated in a hydrogel network.

Electrolytes comprising ionic liquids can also be used to form PGEs, including any of the ionic liquid described herein. To form a PGE using an ionic liquid, a solution of any additives, which can be in a suitable solvent, can be prepared and a monomer can be added. The monomer can be any suitable monomer. For example, acrylamide can be used as a polymerization agent for ionic liquids. To this solution, the ionic liquid along with the additive solution can be mixed along with an initiator. Any suitable initiator for use with the polymerization agent can be used. For example, azobisisobutyronitrile can be used with acrylamide. The initiator can be added in a suitable amount such about 1 wt. % of the polymerization agent. This final solution can then be heated to form a polymerized gel.

Organic electrolytes comprising a salt dissolved in an organic solvent can also be gelled to form an anolyte and/or catholyte. As an example, lithium-ion conducting electrolytes can be gelled using a number of polymerization techniques such as ring-opening polymerization, photo-initiated radical polymerization, UV-initiated radical polymerization, thermal-initiated polymerization, in-situ polymerization, UV-irradiation, electrospinning, and others. The lithium electrolyte can comprise lithium hexafluorophosphate ($LiPF_6$), lithium perchlorate, lithium bis(trifluoromethanesulfonyl)imide, lithium bis(oxalato)borate, and combinations thereof in an organic solvent such as ethylene carbonate, dimethyl carbonate, propylene carbonate, diethyl carbonate, ethyl methyl carbonate, and combinations thereof. An exemplary mixture can include 1 M $LiPF_6$ mixed in a solvent mixture of ethylene carbonate and dimethyl carbonate. Other solvents also exist that can be used as a mixture to reduce the flammability of the organic electrolyte.

The organic electrolyte can be gelled by mixing the selected salts with the organic solvent. A gelling agent can then be added along with an initiator. The gelling agent can be added in an amount between about 0.1 to about 5 wt. % of the mixture, and the initiator can be added in an amount of between about 0.01 to about 1 wt. % of the mixture. In some embodiments, a suitable gelling agent for an organic electrolyte can comprise pentaerythritol tetraacrylate and the initiator can comprise azodiisobutyronitrile. The resulting mixture can be gelled (e.g., polymerized) by heating the mixture to about 50-90° C., or to about 70° C. and holding for 1-24 hours.

For an aqueous electrolyte which is acidic in nature, such as the catholyte, the polymerization can be carried out using a number of processes. In an embodiment, a method for making a solid state gelled aqueous acid electrolyte can comprise the addition of acrylamide to a solution comprising manganese sulfate, ammonium sulfate, potassium permanganate, and/or sulfuric acid ($H_2SO_4$). A gelling agent comprising acrylamide can be added to the solution and mixed at a temperature between about 70-90° C. for at least an hour until the solution is homogenous. After the solution is mixed well, then a cross-linker and initiator can be added to the solution and mixed between 2-48 hours until the solution gels.

The anolytes and catholytes need to be kept separated or decoupled so that neutralization does not take place. While an anolyte PGE and a catholyte PGE can be used without a separator comprising a buffer interlayer, separation of the catholytes and anolytes via one or more buffer interlayers can provide for better battery performance.

Figure 3:
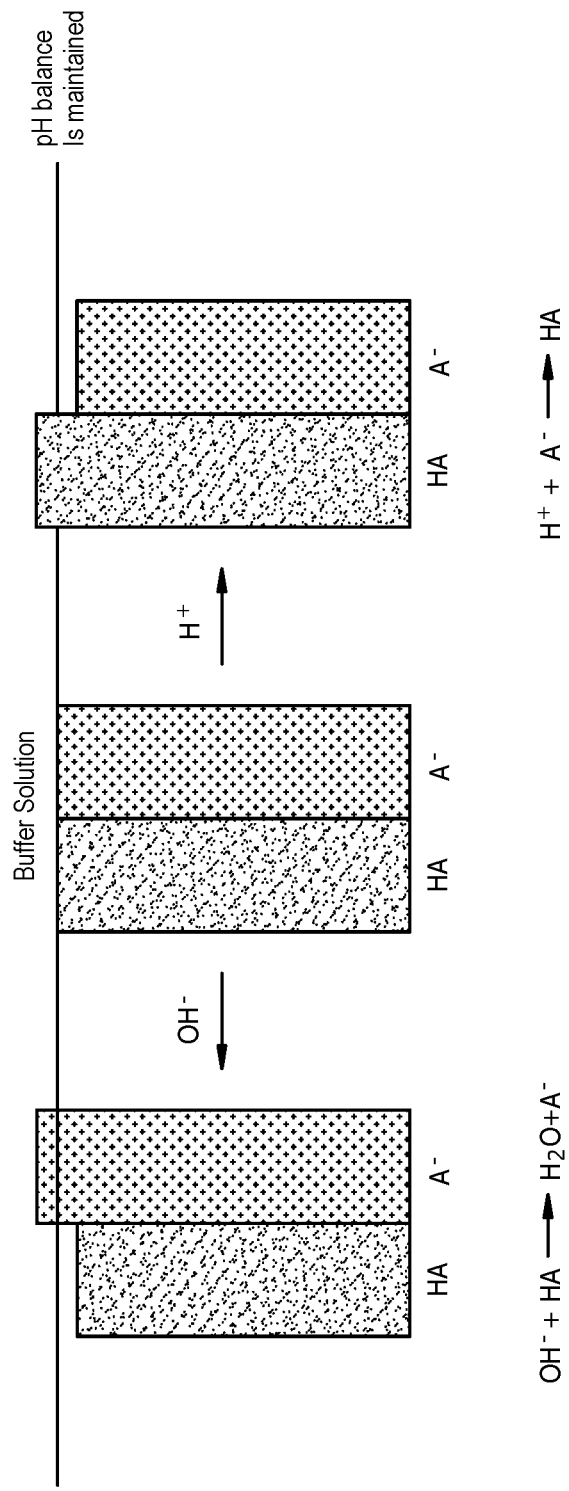
FIG. 3 illustrates a schematic drawing of a buffer layer pH regulating mechanism.

Separation of the anolytes and catholytes can be done through the application of one or more gelled/polymerized buffer interlayer. The buffer interlayer comprises buffer solutions of varying pHs. An example of the functioning mechanism of buffers is shown in FIG. 3, which displays a schematic of the buffer interlayer regulating mechanism. Upon addition of a strong base, the conjugate base concentration increases to maintain the pH; while upon the addition of a strong acid, the concentration of weak acid increases to maintain the pH. The pH of the buffer interlayer always remains constant or near constant (e.g., substantially constant). The buffer interlayers are meant to regulate pH in the battery. Nonlimiting examples of various buffer solutions and their pHs are shown in Table 1. Those skilled in the art will know that there are numerous combinations of chemicals that can be used to form buffer solutions and the mechanism described in this disclosure covers all of them. In some embodiments, in the high voltage membraneless battery as disclosed herein, the buffer aqueous solution may be gelled with the use of potassium acrylate or acrylic acid.

TABLE 1

| pH | Buffer Solution |
|---|---|
| 4 to 4.5 | Sodium Acetate, Acetic Acid |
| 7 | Potassium Phosphate Monobasic, Sodium Hydroxide |
| 4 | Potassium Hydrogen Phthalate |
| 10 | Potassium Carbonate, Potassium Tetraborate, Potassium Hydroxide, Disodium EDTA Dihydrate |
| 7.4 | Tris Buffered Saline (1.37M Sodium Chloride, 0.027M Potassium Chloride, 0.25M Tris/Tris-HCl |
| 8 | Potassium Phosphate Monobasic, Sodium Hydroxide |
| 7 | Potassium Phosphate Monobasic, Sodium Hydroxide |
| 6 | Potassium Phosphate Monobasic, Sodium Hydroxide |
| 5 | Potassium Acid Phthalate, Sodium Hydroxide |
| 1 | Potassium Chloride, Hydrochloric Acid |
| 2 | Potassium Chloride, Hydrochloric Acid |
| 9 | Boric Acid, Potassium Chloride, Sodium Hydroxide |
| 8 | Tris-EDTA |
| 7.5 | Tris Hydrochloride |
| 3 | Potassium Acid Phthalate, Hydrochloric Acid |
| 11 | Buffer concentrate |
| 6 | Buffer solution concentrate |
| 8 | Sodium Chloride-Tris-EDTA |
| Varying | Tris-Acetate-EDTA, Tris-Borate-EDTA, Phosphate Buffer, Borax Standard Buffer, Tris-Glycine-SDS |
| 3-8 | Disodium phosphate, citric acid |
| 2.6-12 | Citric acid, monopotassium phosphate, boric acid, diethyl barbituric acid |
| 7 | Dihydrogen Potassium Phosphate, Sodium Phosphate Dibasic |
| 5 | Potassium hydrogen phthalate (or Potassium Biphthalate), Sodium Hydroxide |

Numerous combinations of buffer solutions are possible other than those stated in Table 1 and for those skilled in the art it will be easy to design buffer solutions. Any suitable buffer solution can be utilized in the buffer interlayer as disclosed herein. The buffer solutions are meant to resist pH changes, and in this battery the role of any buffer solution remains the same: resisting pH change in response to diffusion of protons or hydroxyl ions. Resisting pH changes substantially prevents neutralization reactions from taking place; thus, resulting in maintaining the pH on the cathode and anode side, respectively, and thereby in maintaining the high voltage of the membraneless battery as disclosed herein. The buffer solutions can also be gelled according to the procedure described in detail herein for the gelled electrolyte (e.g., gelled anolyte, gelled catholyte, PGE, etc.). The buffer solutions can also be gelled using potassium acrylate or sodium acrylate or with polyamides or with PVA. The initiation of the gelation may be done with an initiator like potassium persulfate or sodium persulfate or ammonium persulfate.

The buffer interlayer can comprise of a single layer or multiple layers of varying pHs. In some embodiments where more than one buffer interlayer is employed within a battery system, all buffer interlayers may have pH values differing from each other; wherein the buffer interlayers may be based on the same buffer system or on different buffer systems. In other embodiments where more than one buffer interlayer is employed within a battery system, all buffer interlayers may have substantially the same pH value; wherein the buffer interlayers may be based on the same buffer system or on different buffer systems. In yet other embodiments where more than one buffer interlayer is employed within a battery system, some buffer interlayers may have substantially the same pH value, while other buffer interlayers may have pH values differing from each other; wherein the buffer interlayers may be based on the same buffer system or on different buffer systems. There is no limit to the number of layers (i.e., buffer interlayers). The buffer interlayers are meant to maintain the pH within the battery system. In a multiple buffer layering system, an acidic buffer can be preferably paired with the acidic electrolyte (i.e., catholyte 3), while the alkaline buffer can be preferably paired with the alkaline electrolyte (i.e., anolyte 6).

In some embodiments, the membraneless battery as disclosed herein can comprise 1, 2, 3, 4, 5, 6, 7, 8, 9, 10, or more buffer interlayers.

In some embodiments, the buffer interlayer can have a thickness of from about 1 µm to about 10 mm.

In some embodiments, the membraneless battery as disclosed herein can be assembled in a completely polymerized form. The electrolytes can be gelled and the buffer interlayers can be gelled. The assembly of this battery is straightforward without the use of membranes, thus rendering this battery a membraneless solid state polymerized high voltage aqueous battery.

The polymerization process of the buffer interlayer(s) and/or electrolyte(s) can occur prior to the construction of the battery 10 or after the cell is constructed. In some embodiments, the buffer interlayer(s) and/or electrolyte(s) can be polymerized and placed into a tray to form a sheet. Once polymerized, the sheet can be cut into a suitable size and shape and one or more layers can be used to form the buffer interlayer(s) in contact with the electrolyte(s) and/or other buffer interlayer(s); and/or the electrolyte in contact with the corresponding electrode and/or buffer interlayer(s); respectively.

Figure 4:
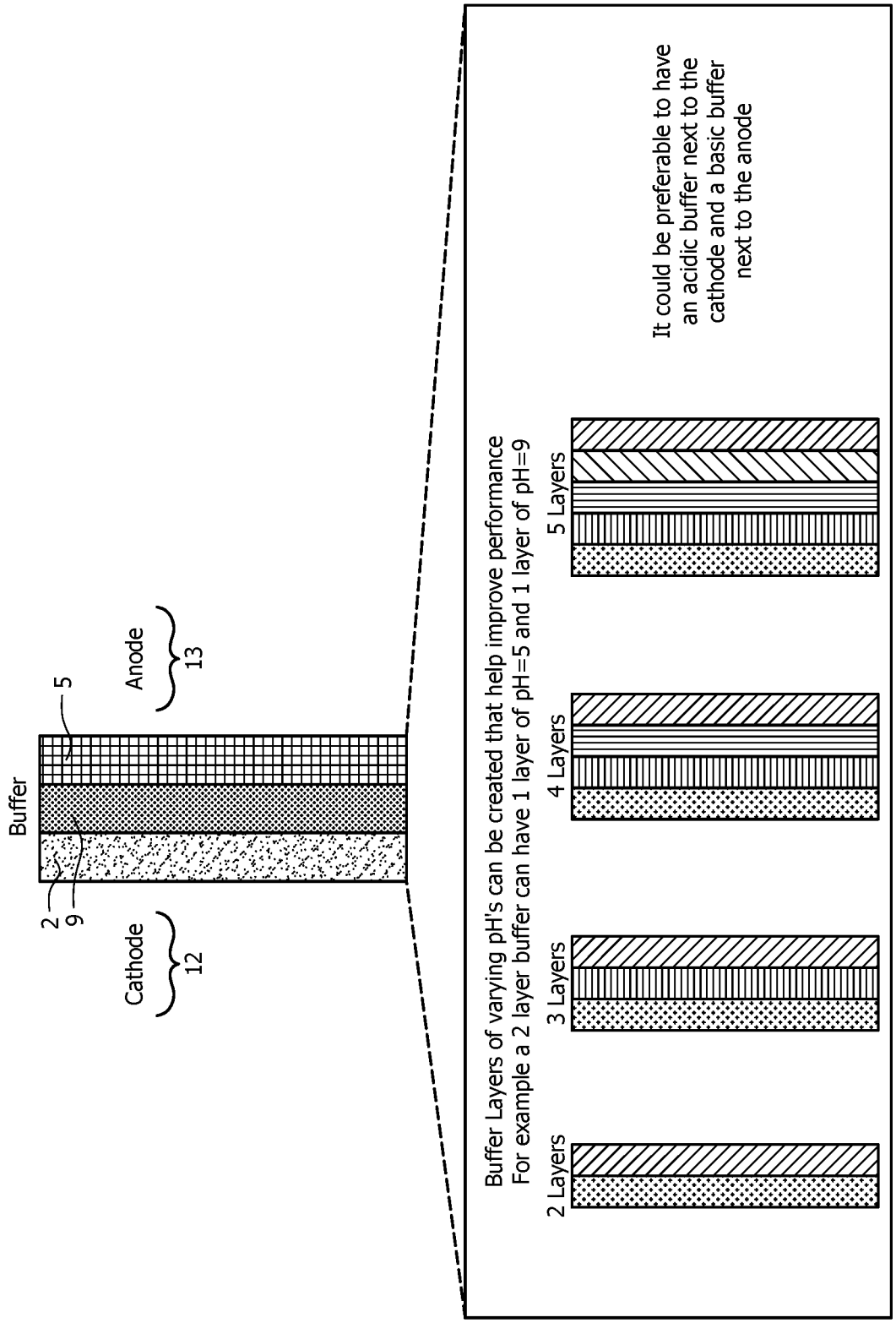
FIG. 4 illustrates a schematic drawing of multiple buffer layers pH regulating mechanism.
Figure 5:
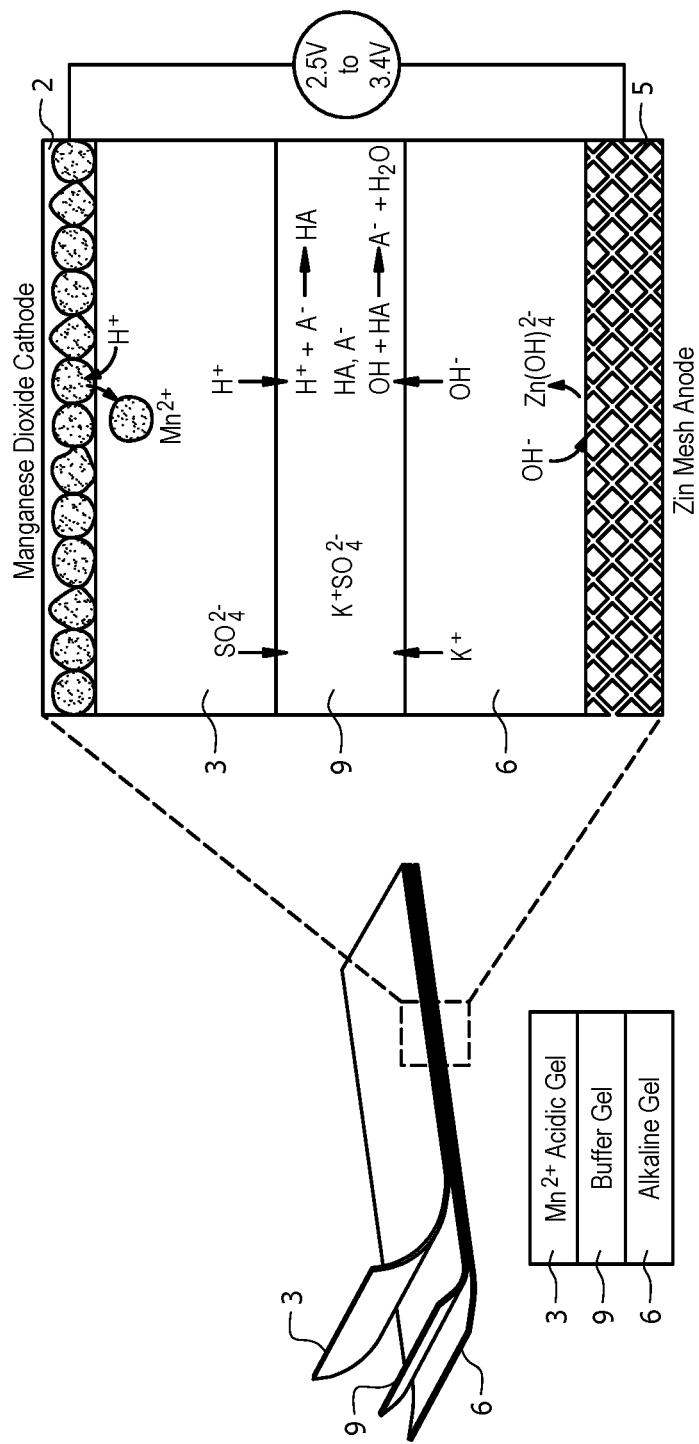
FIG. 5 illustrates a schematic drawing of a MnO$_2$|Zn battery having a buffer interlayer.

The buffer interlayers as disclosed herein can be used in batteries with liquid electrolytes and/or gelled electrolytes. A battery with the gelled electrolytes and the gelled buffer layers constitute a high voltage membraneless $MnO_2|Zn$ battery as disclosed herein, wherein voltages between 2.5 V to 4 V are possible. These high voltages are enabled because of the high protonated (e.g., acidic) and hydroxyl (e.g., basic) concentrations used on the respective acid and alkaline sides. These protonated and hydroxyl ions can be considered as additives or dopants to the gel structure that help improve the voltage properties of the battery. The buffer interlayer helps maintain this stark pH difference by regulating it. The pH regulating properties of the buffer layer can further be enhanced by creating buffer layers comprising of different layers containing different pH's. For example, a two-buffer layer system can be created where one buffer interlayer is acid and the other buffer interlayer is basic. The acidic buffer interlayer can be facing the acidic electrolyte, while the basic buffer interlayer can be facing the alkaline electrolyte. This configuration can advantageously help to maintain the pH of the battery system better. The regulating properties of the buffer interlayer(s) can be further enhanced by having multiple buffer layers of varying pH's. Example of this concept is shown in FIG. 4. FIG. 4 displays a schematic drawing showing the buffering layer concept, wherein multiple buffer layers of varying pH's can help improve the high voltage performance of the membraneless battery as disclosed herein. As these buffer interlayers are gelled/polymerized, it is relatively easy to assemble the buffer interlayers in a battery. A substantially completely polymerized membraneless battery can be made where all the layers are gelled, including the acid electrolyte (i.e., catholyte 3), buffer interlayers and the alkaline electrolyte (i.e., anolyte 6). An example of this substantially completely polymerized battery is shown in FIG. 5. FIG. 5 displays a schematic of a substantially completely polymerized Zn—$MnO_2$ high voltage (2.5 V to 4 V) battery containing a buffer interlayer; wherein the mechanism of buffer regulating the pH is shown in the diagram as well. The polymerized nature of the battery imparts flexible properties which can help this novel battery achieve any form factor for a desired application. The thickness can be relatively easily controlled to be ultrathin so that the volumetric energy density of the battery is very high.

In this disclosure, the first demonstration of an operating high voltage (2.5 V to 4 V) aqueous membraneless $MnO_2$|Zn battery is disclosed, wherein one or more buffer interlayers are used to regulate the pH and advantageously remove the need of expensive ion-exchange or ceramic membranes. In this disclosure, the first demonstration of a substantially completely polymerized battery (e.g., complete polymerized battery) is disclosed, wherein there is no presence of separators or membranes, thus advantageously making it a membraneless battery.

The cathodes and anodes used in the high voltage membraneless battery as disclosed herein can advantageously access 50-100% of the theoretical capacity at wide range of current densities and material loading.

The final cell or battery design could have a cathode with an acidic PGE catholyte and an anode with an alkaline PGE anolyte with an or more buffer interlayers that prevent the intermixing of the two PGE's. A battery with dual electrolytes allows for high reversibility and improved or maximum utilization of the electrodes and thus, a higher energy density. The use of vastly different alkalinity and acidity in the anolyte and catholyte further allows for increasing the average discharge of the battery to equal to or greater than about 3 V.

Once the battery is formed having at least one buffer interlayer disposed therein, the battery 10 can then be used in a primary or secondary battery. When used as a secondary battery, the battery 10 can be cycled during use by being charged and discharged.

In some embodiments, the high voltage membraneless battery as disclosed herein can be used for producing energy. For example, a method for producing energy may comprise (i) discharging the high voltage membraneless battery as disclosed herein to a discharge voltage to produce energy, wherein at least a portion of the Zn of the Zn electroactive material is oxidized during the discharging to form oxidized zinc (e.g., ZnO); and (ii) charging the high voltage membraneless battery to a charge voltage, wherein at least a portion of the oxidized zinc is reduced to Zn during the charging. The discharge voltage can be equal to or greater than about 2 V, alternatively equal to or greater than about 3 V, alternatively equal to or greater than about 3.5 V, alternatively from about 2 V to about 5 V, alternatively from about 3 V to about 5 V, alternatively from about 3 V to about 4 V, or alternatively from about 3.5 V to about 5 V.

EXAMPLES

The subject matter having been generally described, the following examples are given as particular aspects of the disclosure and are included to demonstrate the practice and advantages thereof, as well as preferred aspects and features of the inventions. It should be appreciated by those of skill in the art that the techniques disclosed in the examples which follow represent techniques discovered by the inventors to function well in the practice of the inventions, and thus can be considered to constitute preferred modes for its practice. However, those of skill in the art should, in light of the present disclosure, appreciate that many changes can be made in the specific aspects which are disclosed and still obtain a like or similar result without departing from the scope of the inventions of the instant disclosure. It is understood that the examples are given by way of illustration and are not intended to limit the specification of the claims to follow in any manner.

In all the examples below, the composition of the cathode and anode were fixed. The cathodes were 80 wt. % manganese dioxide and 20 wt. % carbon nanotubes. The anodes were either 97 wt. % zinc powder and 3 wt. % TEFLON, or zinc mesh. The acidic, buffer and alkaline gels were made using the free radical polymerization method, where either the acrylic acid or potassium acrylate was used as the monomer source. The gelation procedure usually involved mixing the acid, buffer or base solution with the monomers either at room temperature or at 60-100° C. Crosslinker like MBA was also added, in the examples below. MBA increases the crosslinking density of the gels, which also helps in slowing the diffusion of neutralizing ions. Potassium persulfate was used as the initiator to initiate the gelation process. The viscosity and robustness of the gel could be improved by increasing the MBA and initiator concentration.

Example 1

Figure 6:
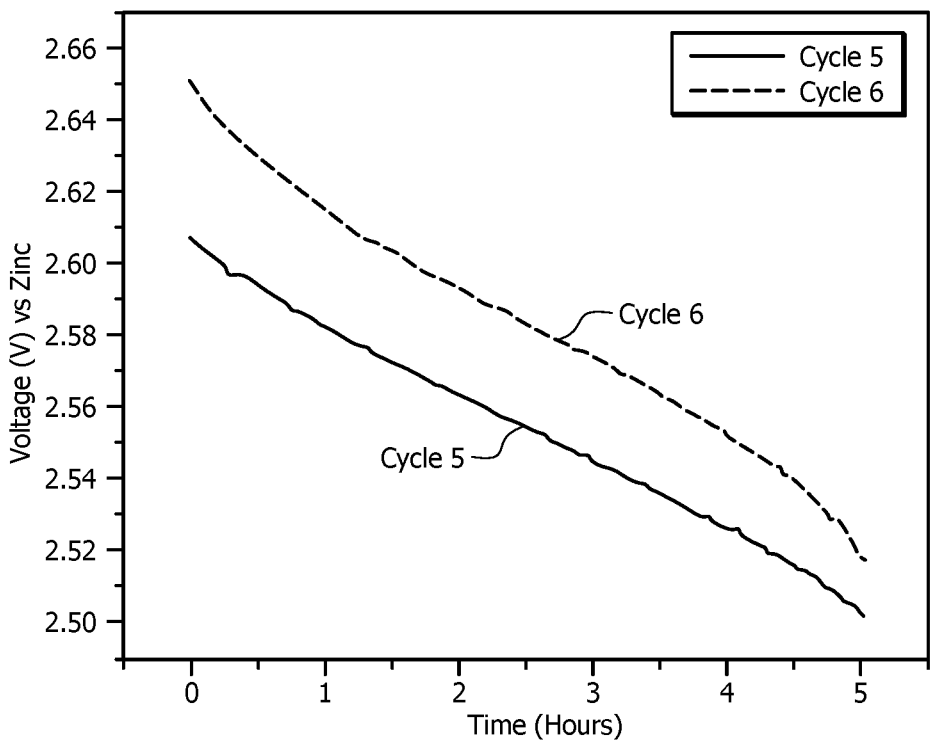
FIG. 6 illustrates performance testing curves of a MnO$_2$|Zn battery according to Example 1.

A membraneless high voltage Zn—$MnO_2$ battery was made, wherein the acid gel was 1 M manganese sulfate and 1 M sulfuric acid, and the alkaline gel was 36 wt. % KOH gel. The buffer gel used had a pH value of 9 and contained a boric acid, potassium chloride, and sodium hydroxide. The buffer gel was placed in between the acid gel and the alkaline gel. The battery was operated trying to access the two electron (617 mAh/g) in 5 hours. The cycling results are shown in FIG. 6, wherein the battery can access the capacity easily in 5 hours. FIG. 6 displays the discharge performance of complete polymerized Zn—$MnO_2$ high voltage battery containing a boric acid, potassium chloride, and sodium hydroxide (pH 9) buffer interlayer. The battery was rated to obtain its complete capacity (617 mAh/g) in 5 hrs. The voltage curves got better with increasing cycle as shown in FIG. 6.

Example 2

Figure 7:
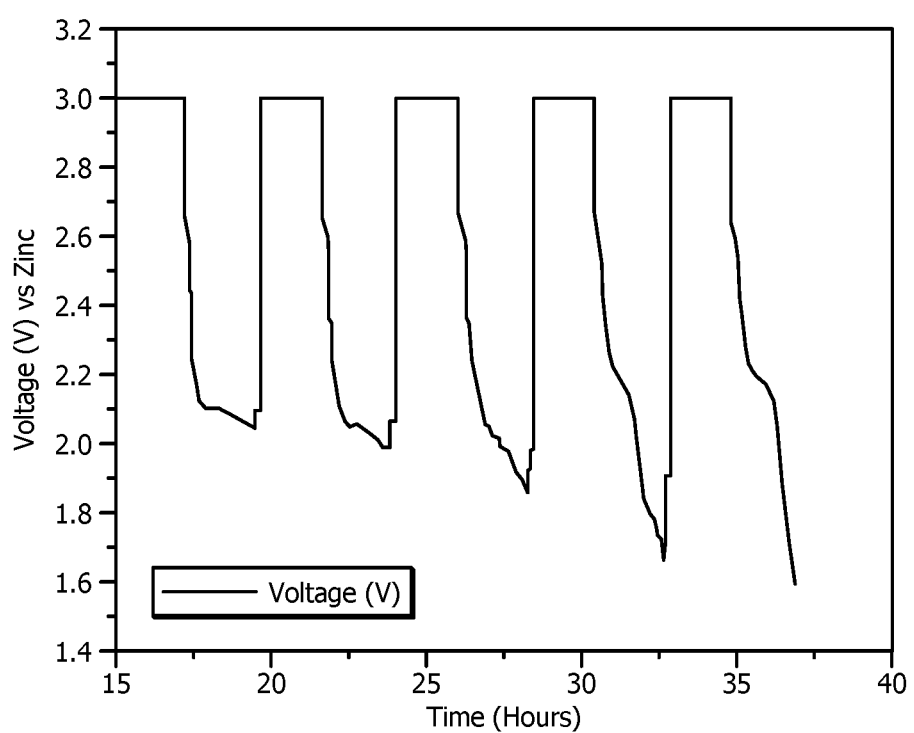
FIG. 7 illustrates performance testing curves of a MnO$_2$|Zn battery according to Example 2.

A membraneless high voltage Zn—$MnO_2$ battery was made, wherein the acid gel was 1 M manganese sulfate and 6 M sulfuric acid, and the alkaline gel was 36 wt. % KOH gel. The buffer gel used had a pH value of 7, and contained a dihydrogen potassium phosphate and sodium phosphate dibasic. The cycling results are shown in FIG. 7. FIG. 7 displays the cycling performance of complete polymerized Zn—$MnO_2$ high voltage battery containing a dihydrogen potassium phosphate, sodium phosphate dibasic (pH 7) buffer interlayer. The battery was cycling at its theoretical one electron capacity (308 mAh/g). The battery was operated trying to cycle the one electron capacity (308 mAh/g), which it was able to do it without any fading in potential. The battery was also stable after 35 hrs. of cycling.

Example 3

Figure 8:
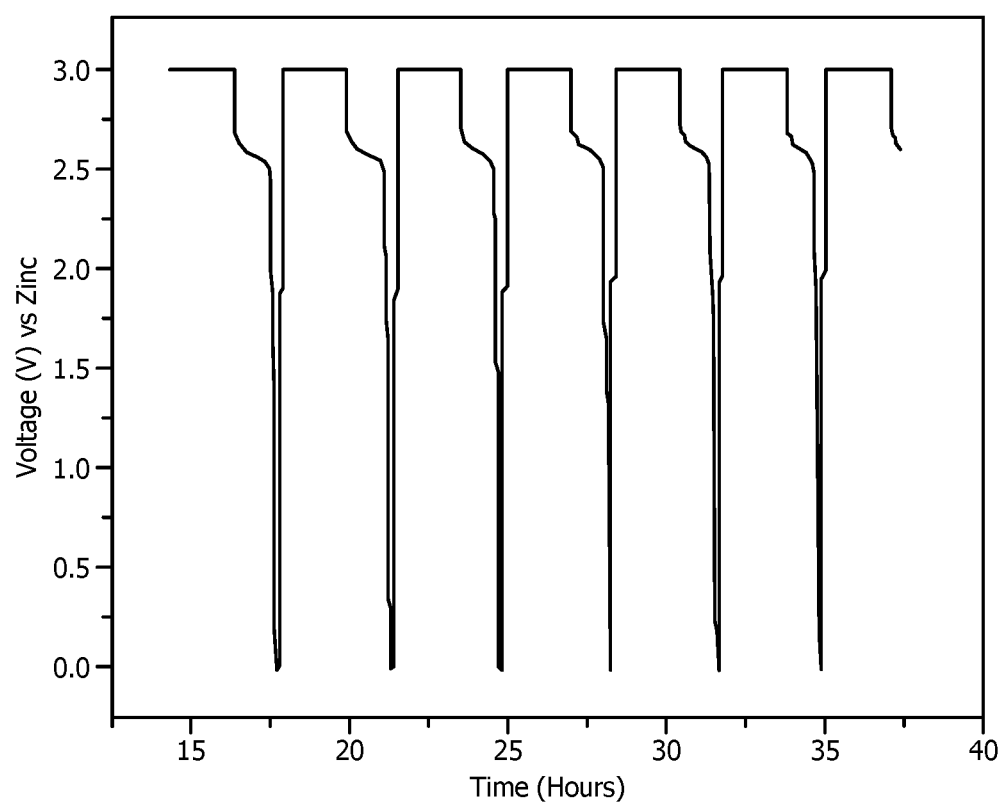
FIG. 8 illustrates performance testing curves of a MnO$_2$|Zn battery according to Example 3.

A membraneless high voltage Zn—$MnO_2$ battery was made, wherein the acid gel was 1 M manganese sulfate and 10 M sulfuric acid, and the alkaline gel was 30 wt. % KOH gel. The buffer gel used had a pH value of 7, and contained a dihydrogen potassium phosphate and sodium phosphate dibasic. The cycling results are shown in FIG. 8, wherein the battery was able to access its theoretical one electron capacity (308 mAh/g) reversibly with an average discharge potential of 2.5 V. FIG. 8 displays the cycling performance of complete polymerized Zn—$MnO_2$ high voltage battery containing a dihydrogen potassium phosphate, sodium phosphate dibasic (pH 7) buffer interlayer; wherein the battery was cycling at its theoretical one electron capacity (308 mAh/g).

Example 4

Figure 9A:
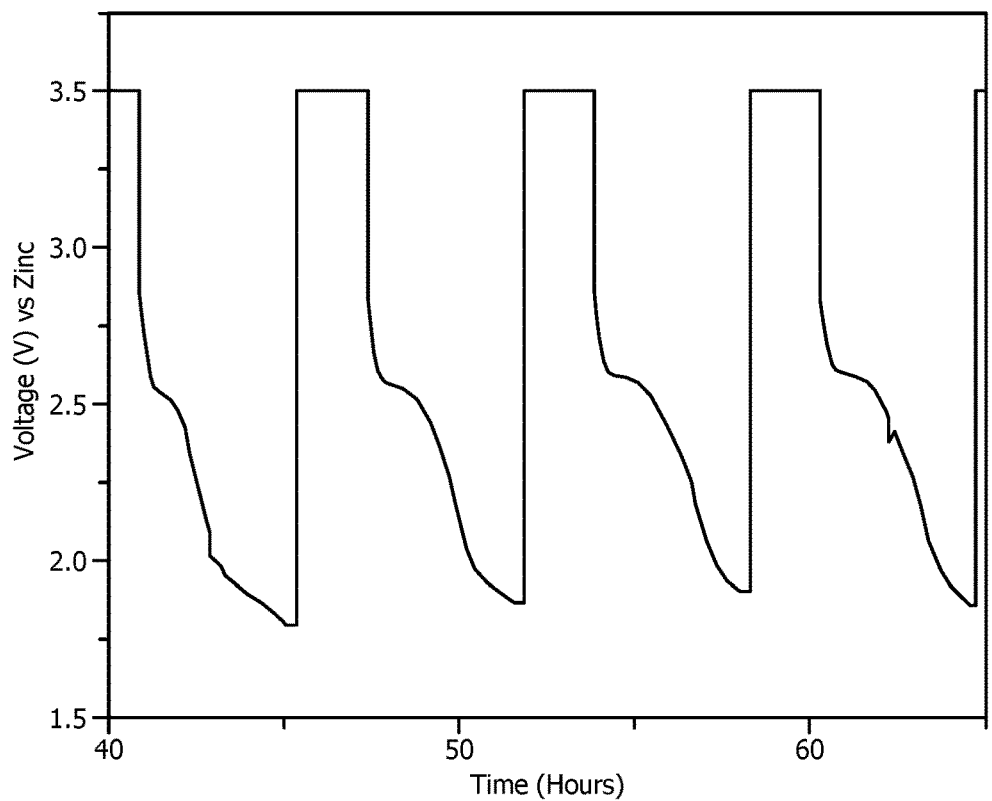
FIG. 9A-9B illustrate performance testing curves of a MnO$_2$|Zn battery according to Example 4.
Figure 9B:
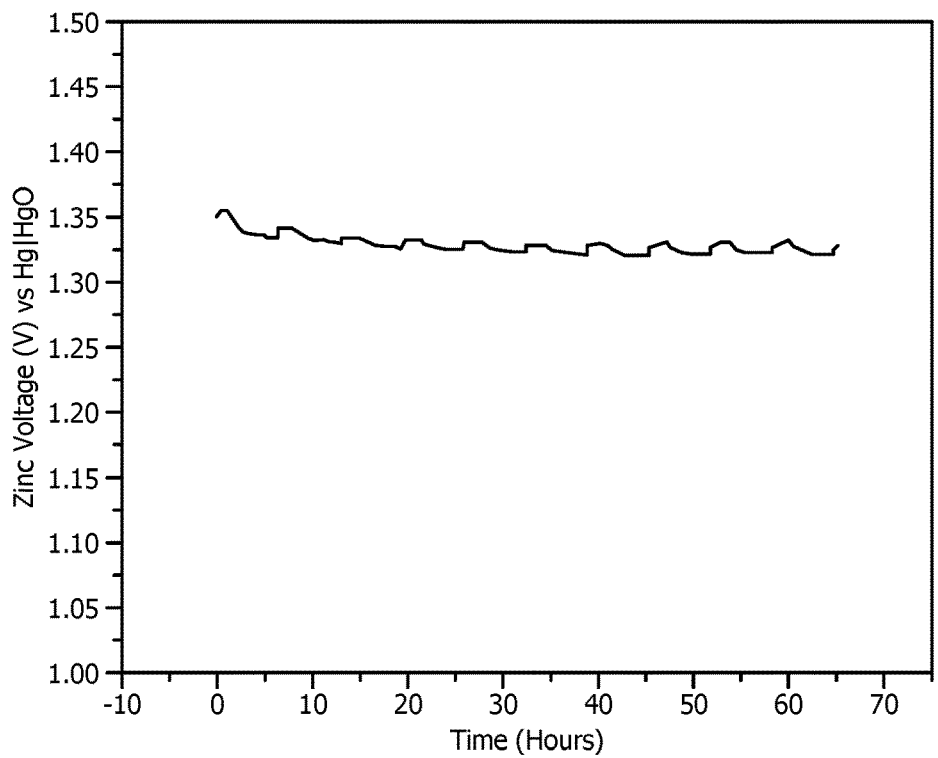

A membraneless high voltage Zn—$MnO_2$ battery was made, wherein the acid gel was 16 M sulfuric acid, and the alkaline gel was 36 wt. % KOH gel. The buffer gel used had a pH value of 7, and contained a dihydrogen potassium phosphate and sodium phosphate dibasic. The alkaline gel also had a mercury|mercury oxide reference electrode to monitor the Zn electrodes change in potential upon cycling. This was done to prove that the potential of Zn electrode doesn't change because of the buffer layer, which further proves that the buffer is preventing neutralizing ions from diffusing. The cycling results are shown in FIG. 9A, wherein the battery was able to cycle reversibly to it operating capacity even after 60 hours of cycling. FIG. 9A displays the cycling performance of complete polymerized Zn—$MnO_2$ high voltage battery containing a dihydrogen potassium phosphate, sodium phosphate dibasic (pH 7) buffer interlayer. The Zn electrode does not change its potential through the cycling the cell, which further proves the buffer is regulating the battery pH, thus highlighting the mechanism of this disclosure. FIG. 9B displays a Zn anode potential measured against a reference electrode in the complete polymerized Zn—$MnO_2$ high voltage battery shown in FIG. 9A; wherein there is no loss in potential of Zn anode due to proton cross over, thus indicating the successful blocking of neutralization reactions.

Example 5

Figure 10:
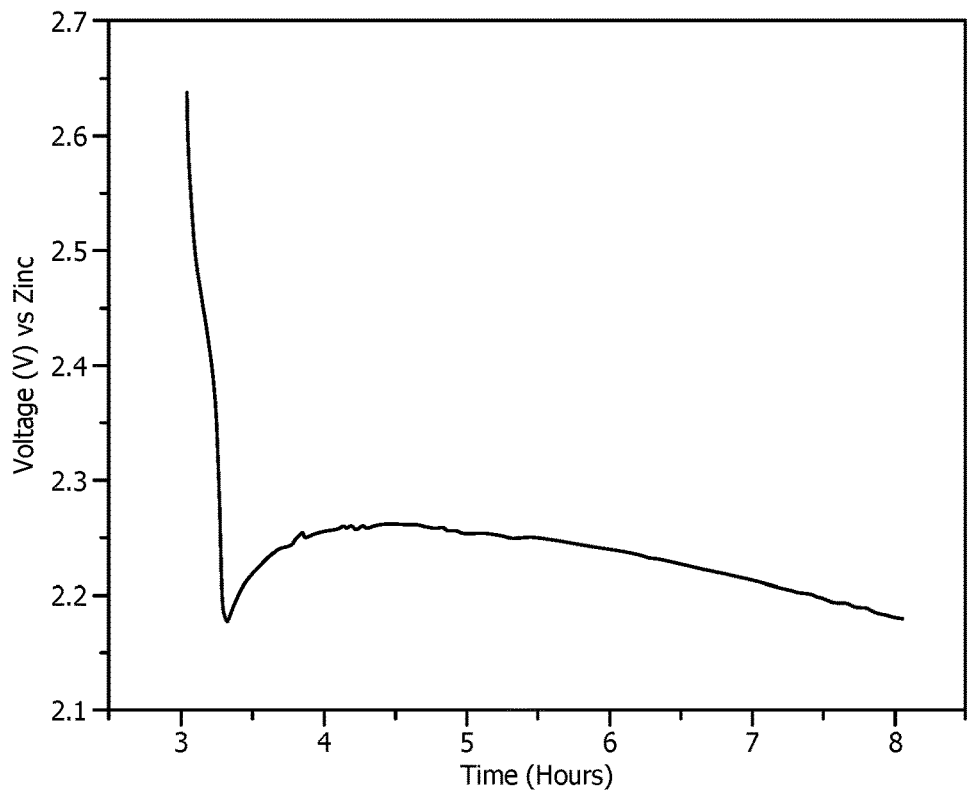
FIG. 10 illustrates a performance testing curve of a MnO$_2$|Zn battery according to Example 5.

A membraneless high voltage Zn—$MnO_2$ battery was made, wherein the acid gel was 16 M sulfuric acid and the alkaline gel was 36 wt. % KOH gel. The buffer gel used had a pH value of 7, and contained a dihydrogen potassium phosphate and sodium phosphate dibasic. The current collector for the cathode was titanium mesh. This battery was made to cycle at 40% depth-of-discharge of one electron capacity, wherein FIG. 10 shows that this battery was able to deliver. FIG. 10 displays the discharge performance of a high voltage Zn—$MnO_2$ battery where it is rated to deliver its 40% of theoretical one electron capacity with a buffer interlayer of pH 7.

Example 6

Figure 11:
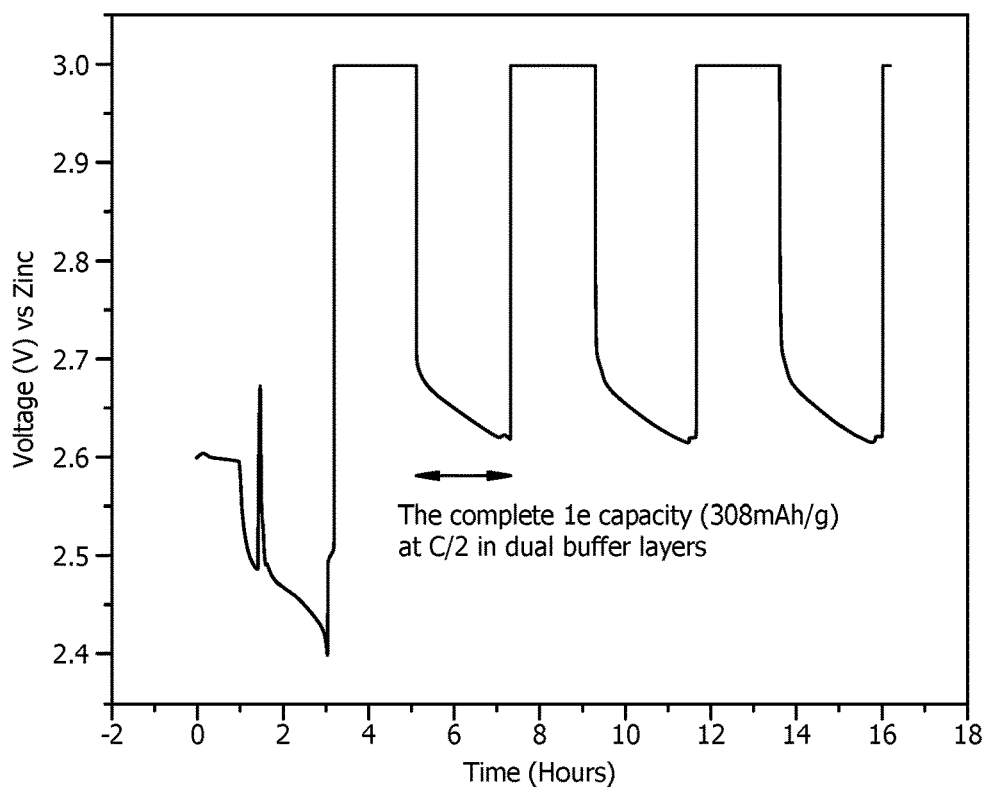
FIG. 11 illustrates a performance testing curve of a MnO$_2$|Zn battery according to Example 6.

A membraneless high voltage Zn—$MnO_2$ battery was made, wherein the acid gel was 1 M manganese sulfate and 1 M sulfuric acid, and the alkaline gel was 15 wt. % KOH gel. Polymerized mild acidic buffer having a pH value of 5 was layered on the acidic polymer gel, and polymerized mild alkaline buffer having a pH value of 9 was layered on the alkaline polymer gel. The cycling results of this battery is shown in FIG. 11. FIG. 11 displays the cycling performance of a polymerized high voltage Zn—$MnO_2$ battery, wherein the battery was designed to deliver and charge the theoretical one electron capacity (308 mAh/g) at 2 hours; and wherein the battery was using 2 buffer layers: polymerized mild acidic buffer of pH 5 layered on the acidic polymer gel, and polymerized mild alkaline buffer of pH 9 layered on the alkaline polymer gel. This an example of multiple buffer layers and this example clearly shows the advantage of having 2 buffer layers. This design minimizes the pH changes in the battery, which helps to cycle the battery at the complete one electron capacity (308 mAh/g) with the minimum potential of the battery reaching 2.6 V. This battery was ~90% energy efficient, which is greater than most of the commercial batteries available.

ADDITIONAL DISCLOSURE

The following is provided as additional disclosure for combinations of features and aspects of the presently disclosed subject matter.

A first aspect, which is a membraneless high voltage battery comprising: a cathode comprising a cathode electroactive material; an anode comprising a Zn electroactive material; a catholyte solution with high proton activity in contact with the cathode, wherein the catholyte is not in contact with the anode; an anolyte solution with high hydroxyl activity in contact with the anode, wherein the anolyte is not in contact with the cathode; and a buffer interlayer or interlayers that regulate the pH in the battery.

A second aspect, which is the battery of the first aspect, wherein the cathode electroactive material comprises manganese dioxide ($MnO_2$), manganese oxides ($Mn_2O_3$, $Mn_3O_4$, MnO), manganese hydroxides (MnOOH, $Mn(OH)_2$), silver oxides (AgO, $Ag_2O$), silver (Ag), nickel (Ni), nickel oxide (NiO, $Ni_2O_3$), nickel hydroxides (NiOOH, $Ni(OH)_2$), cobalt oxide ($Co_3O_4$, CoO), cobalt hydroxides, lead (Pb), lead oxide (PbO, $PbO_2$), copper oxide, copper, copper hydroxide, potassium iron oxide ($K_2FeO_4$), barium iron oxide ($BaFeO_4$), copper hexacyanoferrate, lithium iron phosphate, lithium nickel manganese cobalt oxide, lithium manganese oxide ($LiMn_2O_4$, $Li_2MnO_3$), calix[4]quinone, 1,4-napththo-quinone, 9,10-anthraquinone, vanadium oxide, or a combination thereof.

A third aspect, which is the battery of the first aspect, wherein the anode material containing the Zn, Al, Mg, Fe, Bi, In, Cu, $Mn_2O_3$, $Mn_3O_4$, $MnO_2$, $Fe_2O_3$, $Fe_3O_4$ electroactive material is a powder, foil, mesh, foam, sponge, perforated foil, or a combination thereof.

A fourth aspect, which is the battery of the first aspect, wherein the cathode contains conductive carbon mixed with the cathode active material, wherein the conductive carbon comprises graphite, carbon fiber, carbon black, acetylene black, single walled carbon nanotubes, multi-walled carbon nanotubes, nickel or copper coated carbon nanotubes, dispersions of single walled carbon nanotubes, dispersions of multi-walled carbon nanotubes, graphene, graphyne, graphene oxide, or a combination thereof.

A fifth aspect, which is the battery of the first aspect, wherein the cathode contains additives or dopants which comprise bismuth, bismuth oxide, copper oxide, copper, indium, indium hydroxide, indium oxide, aluminum, aluminum oxide, nickel, nickel hydroxide, nickel oxide, silver, silver oxide, cobalt, cobalt oxide, cobalt hydroxide, lead, lead oxide, lead dioxide, quinones, or a combination thereof.

A sixth aspect, which is the battery of the first aspect, wherein the cathode contains binders comprising methyl cellulose (MC), carboxymethyl cellulose (CMC), hydroxypropyl cellulose (HPH), hydroxypropylmethyl cellulose (HPMC), hydroxethylmethyl cellulose (HEMC), carboxymethylhydroxyethyl cellulose, hydroxyethyl cellulose (HEC), polyvinyl alcohol, TEFLON®, or combinations thereof.

A seventh aspect, which is the battery of any of the first, second, fourth, fifth and sixth aspects, wherein the cathode is pressed onto a current collector comprising carbon, lead, nickel, steel (e.g., stainless steel, etc.), nickel-coated steel, nickel plated copper, tin-coated steel, copper plated nickel, silver coated copper, copper, magnesium, aluminum, tin, iron, platinum, silver, gold, titanium, bismuth, cold rolled steel, half nickel and half copper, carbon foam, carbon felt, polypropylene mesh, or any combination thereof.

An eighth aspect, which is the battery of the seventh aspect, wherein the current collector can be a foil, mesh, perforated foil, foam, honey-combed mesh, sponge-shaped, or any combinations thereof.

A ninth aspect, which is the battery of any of the first, second, fourth, fifth and sixth aspects, wherein the cathode comprises 1 to 99 wt. % electroactive material, conductive carbon 1 to 99 wt. %, additives 0 to 30 wt. %, and binder 0 to 10 wt. %.

A tenth aspect, which is the battery of any of the first and third aspects, wherein the anode material comprises conductive carbon mixed with anode electroactive material, wherein the carbon comprises graphite, carbon fiber, carbon black, acetylene black, single walled carbon nanotubes, multi-walled carbon nanotubes, nickel or copper coated carbon nanotubes, dispersions of single walled carbon nanotubes, dispersions of multi-walled carbon nanotubes, graphene, graphyne, graphene oxide, or a combination thereof.

An eleventh aspect, which is the battery of any of the first and third aspects, wherein the anode material comprises additives or dopants, which are bismuth, bismuth oxide, indium, indium oxide, indium hydroxide, cetyltrimethylammonium bromide, sodium dodecyl sulfate, calcium hydroxide, sodium dodecylbenzene sulfonate, polyethylene glycol, zinc oxide, or combinations thereof.

A twelfth aspect, which is the battery of any of the first, third, tenth and eleventh aspects, wherein the anode material comprises binders, which are methyl cellulose (MC), carboxymethyl cellulose (CMC), hydroxypropyl cellulose (HPH), hydroxypropylmethyl cellulose (HPMC), hydroxyethylmethyl cellulose (HEMC), carboxymethylhydroxyethyl cellulose, hydroxyethyl cellulose (HEC), polyvinyl alcohol, TEFLON®, or combinations thereof.

A thirteenth aspect, which is the battery of any of the first, third, tenth, eleventh and twelfth aspects, wherein the anode material is pressed on a current collector comprising carbon, lead, nickel, steel (e.g., stainless steel, etc.), nickel-coated steel, nickel plated copper, tin-coated steel, copper plated nickel, silver coated copper, copper, magnesium, aluminum, tin, iron, platinum, silver, gold, titanium, bismuth, titanium, cold rolled steel, half nickel and half copper, carbon foam, carbon felt, polypropylene mesh, or any combination thereof.

A fourteenth aspect, which is the battery of any of the first, third, tenth, eleventh and twelfth aspects, wherein the anode comprises 1-100 wt. % electroactive Zn, 0-10 wt. % conductive carbon, 0-30 wt. % additives or dopants, and 0-10 wt. % binders.

A fifteenth aspect, which is the battery of the first aspect, wherein the catholyte of high proton activity comprises hydrogen phosphate, bicarbonates, ammonium cation, hydrogen sulfide, acetic acid, hydrogen fluoride, phosphoric acid, sulfuric acid, nitric acid, hydrochloric acid, hydrogen bromide, hydroiodic acid, triflic acid, or combinations thereof.

A sixteenth aspect, which is the battery of any of the first and fifteenth aspects, wherein the electrolyte additives to the catholyte comprise manganese sulfate, nickel sulfate, potassium permanganate, manganese chloride, manganese acetate, manganese triflate, bismuth chloride, bismuth nitrate, manganese nitrate, nickel sulfate, nickel nitrate, zinc sulfate, zinc chloride, zinc acetate, zinc triflate, indium chloride, copper sulfate, copper chloride, lead sulfate, sodium persulfate, potassium persulfate, ammonium persulfate, ammonium chloride, vanillin, potassium chloride, sodium chloride, lithium nitrate, lithium chloride, lithium carbonate, lithium acetate, lithium triflate, aluminum trifluoromethanesulfonate, aluminum chloride, aluminum nitrate, potassium sulfate, sodium sulfate, ammonium sulfate, or combinations thereof.

A seventeenth aspect, which is the battery of the first aspect, wherein the anolyte with high hydroxyl activity comprises ammonia, methylamine, glycine, lithium hydroxide, sodium hydroxide, potassium hydroxide, caesium hydroxide, rubidium hydroxide, calcium hydroxide, strontium hydroxide, barium hydroxide, or combinations thereof.

An eighteenth aspect, which is the battery of the first aspect, wherein the electrolyte additives to the anolyte comprise vanillin, indium hydroxide, zinc acetate, zinc oxide, cetyltrimethylammonium bromide, sodium dodecyl sulfate, sodium dodecylbenzene sulfonate, polyethylene glycol, ethanol, methanol, zinc gluconate, glucose, or combinations thereof.

A nineteenth aspect, which is the battery of any of the first, fifteenth, sixteenth, seventeenth and eighteenth aspects, wherein the catholyte and anolyte can be gelled or polymerized.

A twentieth aspect, which is the battery of the first aspect, wherein the buffer interlayer or interlayers are combinations of weak acid and conjugate base and/or weak base and conjugate acid, or combinations thereof.

A twenty-first aspect, which is the battery of any of the first and twentieth aspects, wherein the buffer interlayer or interlayers have acidic, neutral and/or alkaline pHs.

A twenty-second aspect, which is the battery of any of the first, twentieth and twenty-first aspects, wherein the acidic buffer interlayer is preferably placed on the acid gel electrolyte and the basic buffer interlayer is preferably placed on the alkaline gel electrolyte.

A twenty-third aspect, which is a membraneless high voltage battery comprising a cathode comprising a cathode electroactive material; an anode comprising an anode electroactive material; a catholyte in contact with the cathode, wherein the catholyte is not in contact with the anode, and wherein the catholyte has a pH of less than 4; an anolyte in contact with the anode, wherein the anolyte is not in contact with the cathode, and wherein the anolyte has a pH of greater than 10; and one or more buffer interlayers disposed between the anolyte and the catholyte, wherein the one or more buffer interlayers regulate a pH in the battery.

A twenty-fourth aspect, which is the battery of the twenty-third aspect, wherein the one or more buffer interlayers are gelled or polymerized.

A twenty-fifth aspect, which is the battery of any one of the twenty-third and twenty-fourth aspects, wherein each of the one or more buffer interlayers individually has an acidic pH value of less than 7, a neutral pH value of 7, or a basic pH value of greater than 7.

A twenty-sixth aspect, which is the battery of any one of the twenty-third through twenty-fifth aspects, wherein the one or more buffer interlayers comprise at least two buffer interlayers, and wherein the buffer interlayers have the same or different pH values.

A twenty-seventh aspect, which is the battery of any one of the twenty-third through twenty-sixth aspects, wherein the one or more buffer interlayers comprise at least one acidic buffer interlayer and/or at least one basic buffer interlayer; wherein the at least one acidic buffer interlayer, when present, contacts the anolyte; and wherein the at least one basic buffer interlayer, when present, contacts the catholyte.

A twenty-eighth aspect, which is the battery of any one of the twenty-third through twenty-seventh aspects, wherein each of the one or more buffer interlayers individually comprises (i) a weak acid and a conjugate base, and/or (ii) a weak base and a conjugate acid.

A twenty-ninth aspect, which is the battery of any one of the twenty-third through twenty-eighth aspects, wherein each of the one or more buffer interlayers individually comprises a buffer system selected from the group consisting of (a) sodium acetate, acetic acid; with a pH value of about 4 to about 4.5; (b) potassium phosphate monobasic, sodium hydroxide; with a pH value of about 7; (c) potassium hydrogen phthalate; with a pH value of about 4; (d) potassium carbonate, potassium tetraborate, potassium hydroxide, disodium EDTA dihydrate; with a pH value of about 10; (e) Tris buffered saline (sodium chloride, potassium chloride, Tris/Tris-HCl); with a pH value of about 7.4; (f) potassium phosphate monobasic, sodium hydroxide; with a pH value of about 8; (g) potassium phosphate monobasic, sodium hydroxide; with a pH value of about 6; (h) potassium acid phthalate, sodium hydroxide; with a pH value of about 5; (i) potassium chloride, hydrochloric acid; with a pH value of about 1; (j) potassium chloride, hydrochloric acid; with a pH value of about 2; (k) boric acid, potassium chloride, sodium hydroxide; with a pH value of about 9; (l) Tris-EDTA; with a pH value of about 8; (m) Tris hydrochloride; with a pH value of about 7.5; (n) potassium acid phthalate, hydrochloric acid; with a pH value of about 3; (o) buffer concentrate; with a pH value of about 11; (p) buffer solution concentrate; with a pH value of about 6; (q) sodium chloride-Tris-EDTA; with a pH value of about 8; (r) Tris-acetate-EDTA, Tris-borate-EDTA, phosphate buffer, borax standard buffer, Tris-glycine-SDS; with varying pH values; (s) disodium phosphate, citric acid; with a pH value of about 3 to about 8; (t) citric acid, monopotassium phosphate, boric acid, diethyl barbituric acid; with a pH value of about 2.6 to about 12; (u) dihydrogen potassium phosphate, sodium phosphate dibasic; with a pH value of about 7; (v) potassium hydrogen phthalate, sodium hydroxide; with a pH value of about 5; (w) potassium biphthalate, sodium hydroxide; with a pH value of about 5; and (x) any combinations of (a)-(w).

A thirtieth aspect, which is the battery of any one of the twenty-third through twenty-ninth aspects, wherein the battery is characterized by an average discharge potential of from about 2 V to about 5 V.

A thirty-first aspect, which is the battery of any one of the twenty-third through thirtieth aspects, wherein the battery is characterized by an average discharge potential of equal to or greater than about 3 V.

A thirty-second aspect, which is the battery of any one of the twenty-third through thirty-first aspects, wherein the anolyte comprises a gelled or polymerized electrolyte first solution, and wherein the catholyte comprises a second gelled or polymerized electrolyte solution.

A thirty-third aspect, which is the battery of any one of the twenty-third through thirty-second aspects, wherein the battery is a solid state battery.

A thirty-fourth aspect, which is the battery of any one of the twenty-third through thirty-third aspects, wherein the cathode electroactive material comprises at least one of a manganese oxide, manganese dioxide ($MnO_2$), $Mn_2O_3$, $Mn_3O_4$, MnO; a manganese hydroxide, MnOOH, $Mn(OH)_2$; a silver oxide, AgO, $Ag_2O$; silver (Ag); nickel (Ni); a nickel oxide, NiO, $Ni_2O_3$; a nickel hydroxide, NiOOH, $Ni(OH)_2$; a cobalt oxide, $Co_3O_4$, CoO; a cobalt hydroxide; lead (Pb); a lead oxide, PbO, $PbO_2$; a copper oxide; copper (Cu); a copper hydroxide; potassium iron oxide ($K_2FeO_4$); barium iron oxide ($BaFeO_4$); copper hexacyanoferrate; lithium iron phosphate; lithium nickel manganese cobalt oxide; a lithium manganese oxide, $LiMn_2O_4$, $Li_2MnO_3$; calix[4]quinone; 1,4-napthhoquinone; 9,10-anthraquinone; vanadium oxide; and any mixture thereof.

A thirty-fifth aspect, which is the battery of any one of the twenty-third through thirty-fourth aspects, wherein the cathode comprises a conductive carbon, wherein the conductive carbon is mixed with the cathode electroactive material, and wherein the conductive carbon comprises graphite, carbon fiber, carbon black, acetylene black, single walled carbon nanotubes, multi-walled carbon nanotubes, nickel coated carbon nanotubes, copper coated carbon nanotubes, dispersions of single walled carbon nanotubes, dispersions of multi-walled carbon nanotubes, graphene, graphyne, graphene oxide, and combinations thereof.

A thirty-sixth aspect, which is the battery of any one of the twenty-third through thirty-fifth aspects, wherein the cathode comprises an additive and/or dopant, and wherein the additive and/or dopant comprises bismuth, bismuth oxide, copper oxide, copper, indium, indium hydroxide, indium oxide, aluminum, aluminum oxide, nickel, nickel hydroxide, nickel oxide, silver, silver oxide, cobalt, cobalt oxide, cobalt hydroxide, lead, lead oxide, lead dioxide, quinones, or a combination thereof.

A thirty-seventh aspect, which is the battery of any one of the twenty-third through thirty-sixth aspects, wherein the cathode comprises a binder, and wherein the binder comprises methyl cellulose (MC), carboxymethyl cellulose (CMC), hydroxypropyl cellulose (HPH), hydroxypropylmethyl cellulose (HPMC), hydroxethylmethyl cellulose (HEMC), carboxymethylhydroxyethyl cellulose, hydroxyethyl cellulose (HEC), polyvinyl alcohol, TEFLON, or a combination thereof.

A thirty-eighth aspect, which is the battery of any one of the twenty-third through thirty-seventh aspects, wherein the cathode comprises a pressed cathode material on a current collector, wherein the current collector comprises carbon, lead, nickel, steel, stainless steel, nickel-coated steel, nickel plated copper, tin-coated steel, copper plated nickel, silver coated copper, copper, magnesium, aluminum, tin, iron, platinum, silver, gold, bismuth, titanium, cold rolled steel, half nickel and half copper, polypropylene, or any combination thereof.

A thirty-ninth aspect, which is the battery of any one of the twenty-third through thirty-eighth aspects, wherein the current collector is a foil, mesh, perforated foil, foam, felt, fibrous, porous block architecture, honey-combed mesh, sponge-shaped, or any combinations thereof.

A fortieth aspect, which is the battery of any one of the twenty-third through thirty-ninth aspects, wherein the cathode comprises 1-99 wt. % of a cathode electroactive material, 1-99 wt. % of a conductive carbon, 0-30 wt. % of an additive and/or dopant, and 0-10 wt. % of a binder, based on a total weight of the cathode.

A forty-first aspect, which is the battery of any one of the twenty-third through fortieth aspects, wherein the anode electroactive material comprises zinc (Zn); aluminum (Al); magnesium (Mg); iron (Fe); iron oxide, $Fe_2O_3Fe_3O_4$; bismuth (Bi); indium (In); copper (Cu); a manganese oxide, manganese dioxide ($MnO_2$), $Mn_2O_3$, $Mn_3O_4$; and any mixture thereof.

A forty-second aspect, which is the battery of any one of the twenty-third through forty-first aspects, wherein the anode electroactive material is a powder, foil, mesh, foam, sponge, perforated foil, or a combination thereof.

A forty-third aspect, which is the battery of any one of the twenty-third through forty-second aspects, wherein the anode electroactive material comprises a Zn electroactive material.

A forty-fourth aspect, which is the battery of any one of the twenty-third through forty-third aspects, wherein the anode comprises conductive carbon, wherein the conductive carbon is mixed with the anode electroactive material, and wherein the carbon comprises graphite, carbon fiber, carbon black, acetylene black, single walled carbon nanotubes, multi-walled carbon nanotubes, nickel coated carbon nanotubes, copper coated carbon nanotubes, dispersions of single walled carbon nanotubes, dispersions of multi-walled carbon nanotubes, graphene, graphyne, graphene oxide, and combinations thereof.

A forty-fifth aspect, which is the battery of any one of the twenty-third through forty-fourth aspects, wherein the anode comprises an additive and/or dopant, and wherein the additive and/or dopant comprises bismuth, bismuth oxide, indium, indium oxide, indium hydroxide, cetyltrimethylammonium bromide, sodium dodecyl sulfate, calcium hydroxide, sodium dodecylbenzene sulfonate, polyethylene glycol, zinc oxide, or a combination thereof.

A forty-sixth aspect, which is the battery of any one of the twenty-third through forty-fifth aspects, wherein the anode comprises a binder, and wherein the binder comprises methyl cellulose (MC), carboxymethyl cellulose (CMC), hydroxypropyl cellulose (HPH), hydroxypropylmethyl cellulose (HPMC), hydroxethylmethyl cellulose (HEMC), carboxymethylhydroxyethyl cellulose, hydroxyethyl cellulose (HEC), polyvinyl alcohol, TEFLON, or a combination thereof.

A forty-seventh aspect, which is the battery of any one of the twenty-third through forty-sixth aspects, wherein the anode comprises a pressed anode material on a current collector, wherein the current collector comprises carbon, lead, nickel, steel, stainless steel, nickel-coated steel, nickel plated copper, tin-coated steel, copper plated nickel, silver coated copper, copper, magnesium, aluminum, tin, iron, platinum, silver, gold, bismuth, titanium, cold rolled steel, half nickel and half copper, polypropylene, or any combination thereof.

A forty-eighth aspect, which is the battery of the forty-seventh aspect, wherein the current collector is a foil, mesh, perforated foil, foam, felt, fibrous, porous block architecture, honey-combed mesh, sponge-shaped, or any combinations thereof.

A forty-ninth aspect, which is the battery of any one of the twenty-third through forty-eighth aspects, wherein the anode comprises 1-100 wt. % of a Zn electroactive material, 0-10 wt. % of a conductive carbon, 0-30 wt. % of an additive and/or dopant, and 0-10 wt. % of a binder, based on a total weight of the anode.

A fiftieth aspect, which is the battery of any one of the twenty-third through forty-ninth aspects, wherein the catholyte comprises an acidic electrolyte; and wherein the acidic electrolyte comprises at least one of hydrogen phosphate, bicarbonates, ammonium cation, hydrogen sulfide, acetic acid, hydrogen fluoride, phosphoric acid, sulfuric acid, nitric acid, hydrochloric acid, hydrogen bromide, hydroiodic acid, triflic acid, and any mixture thereof.

A fifty-first aspect, which is the battery of any one of the twenty-third through fiftieth aspects, wherein the acidic electrolyte is present in the catholyte in a concentration of between about 0.1 M and about 16 M.

A fifty-second aspect, which is the battery of any one of the twenty-third through fifty-first aspects, wherein the catholyte comprises a catholyte additive; and wherein the catholyte additive comprises at least one of manganese sulfate, nickel sulfate, potassium permanganate, manganese chloride, manganese acetate, manganese triflate, bismuth chloride, bismuth nitrate, manganese nitrate, nickel sulfate, nickel nitrate, zinc sulfate, zinc chloride, zinc acetate, zinc triflate, indium chloride, copper sulfate, copper chloride, lead sulfate, sodium persulfate, potassium persulfate, ammonium persulfate, ammonium chloride, vanillin, potassium chloride, sodium chloride, lithium nitrate, lithium chloride, lithium carbonate, lithium acetate, lithium triflate, aluminum trifluoromethanesulfonate, aluminum chloride, aluminum nitrate, potassium sulfate, sodium sulfate, ammonium sulfate, and any mixture thereof.

A fifty-third aspect, which is the battery of any of the twenty-third through fifty-second aspects, wherein the anolyte comprises an alkaline electrolyte; and wherein the alkaline electrolyte comprises at least one of ammonia, methylamine, glycine, lithium hydroxide, sodium hydroxide, potassium hydroxide, caesium hydroxide, rubidium hydroxide, calcium hydroxide, strontium hydroxide, barium hydroxide, and any mixture thereof.

A fifty-fourth aspect, which is the battery of any of the twenty-third through fifty-third aspects, wherein the alkaline electrolyte is present in the anolyte in an amount of 20-60 wt. %, based on the total weight of the anolyte.

A fifty-fifth aspect, which is the battery of any of the twenty-third through fifty-fourth aspects, wherein the anolyte comprises an anolyte additive; and wherein the anolyte additive comprises at least one of vanillin, indium hydroxide, zinc acetate, zinc oxide, cetyltrimethylammonium bromide, sodium dodecyl sulfate, sodium dodecylbenzene sulfonate, polyethylene glycol, ethanol, methanol, zinc gluconate, glucose, and any mixture thereof.

A fifty-sixth aspect, which is the battery of any of the twenty-third through fifty-fifth aspects, wherein the catholyte, the anolyte, or both are gelled or polymerized.

A fifty-seventh aspect, which is a membraneless high voltage zinc (Zn)-anode battery comprising a cathode comprising a cathode electroactive material; an anode comprising an anode electroactive material, wherein the anode electroactive material comprises a Zn electroactive material; a catholyte in contact with the cathode, wherein the catholyte is not in contact with the anode, and wherein the catholyte has a pH of less than 2; an anolyte in contact with the anode, wherein the anolyte is not in contact with the cathode, and wherein the anolyte has a pH of greater than 12; and one or more buffer interlayers disposed between the anolyte and the catholyte; wherein the one or more buffer interlayers regulate a pH in the battery; wherein the one or more buffer interlayers comprise at least one acidic buffer interlayer and/or at least one basic buffer interlayer; wherein the at least one acidic buffer interlayer, when present, contacts the anolyte; and wherein the at least one basic buffer interlayer, when present, contacts the catholyte.

A fifty-eighth aspect, which is the battery of the fifty-seventh aspect, wherein the one or more buffer interlayers are gelled or polymerized.

A fifty-ninth aspect, which is the battery of any of the fifty-seventh and fifty-eighth aspects, wherein each of the one or more buffer interlayers individually comprises (i) a weak acid and a conjugate base, and/or (ii) a weak base and a conjugate acid.

A sixtieth aspect, which is the battery of any of the fifty-seventh through fifty-ninth aspects, wherein the catholyte comprises an acidic electrolyte; wherein the acidic electrolyte comprises at least one of hydrogen phosphate, bicarbonates, ammonium cation, hydrogen sulfide, acetic acid, hydrogen fluoride, phosphoric acid, sulfuric acid, nitric acid, hydrochloric acid, hydrogen bromide, hydroiodic acid, triflic acid, and any mixture thereof; and wherein the acidic electrolyte is present in the catholyte in a concentration of between about 1 M and about 16 M.

A sixty-first aspect, which is the battery of any of the fifty-seventh through sixtieth aspects, wherein the anolyte comprises an alkaline electrolyte; wherein the alkaline electrolyte comprises at least one of ammonia, methylamine, glycine, lithium hydroxide, sodium hydroxide, potassium hydroxide, caesium hydroxide, rubidium hydroxide, calcium hydroxide, strontium hydroxide, barium hydroxide, and any mixture thereof; and wherein the alkaline electrolyte is present in the anolyte in an amount of 30-55 wt. %, based on the total weight of the anolyte.

A sixty-second aspect, which is the battery of any of the fifty-seventh through sixty-first aspects, wherein the battery is characterized by an average discharge potential of from about 3 V to about 5 V.

A sixty-third aspect, which is the battery of any of the fifty-seventh through sixty-second aspects, wherein the catholyte, the anolyte, and the one or more buffer interlayers are gelled or polymerized; and wherein the battery is a solid state battery.

A sixty-fourth aspect, which is a method of forming a membraneless high voltage zinc (Zn)-anode battery, the method comprising: disposing a catholyte in contact with a cathode, wherein the cathode comprises a cathode electroactive material, and wherein the catholyte has a pH of less than 4; disposing an anolyte in contact with an anode, wherein the anode comprises a Zn electroactive material, and wherein the anolyte has a pH of greater than 10; and disposing at least one buffer interlayer between the anolyte and the catholyte, wherein the catholyte is not in contact with the anode, wherein the anolyte is not in contact with the cathode, and wherein the one or more buffer interlayers regulate a pH in the battery.

A sixty-fifth aspect, which is the method of the sixty-fourth aspect, further comprising disposing the catholyte, the anolyte, the anode, the cathode, and the at least one buffer interlayer in a housing to form the membraneless high voltage Zn-anode battery.

A sixty-sixth aspect, which is the method of any of the sixty-fourth and sixty-fifth aspects, wherein the at least one buffer interlayer is gelled or polymerized.

A sixty-seventh aspect, which is the method of any of the sixty-fourth through sixty-sixth aspects, wherein each of the at least one buffer interlayer individually comprises (i) a weak acid and a conjugate base, and/or (ii) a weak base and a conjugate acid.

A sixty-eighth aspect, which is the method of any of the sixty-fourth through sixty-seventh aspects, wherein the catholyte comprises an acidic electrolyte; wherein the acidic electrolyte comprises at least one of hydrogen phosphate, bicarbonates, ammonium cation, hydrogen sulfide, acetic acid, hydrogen fluoride, phosphoric acid, sulfuric acid, nitric acid, hydrochloric acid, hydrogen bromide, hydroiodic acid, triflic acid, and any mixture thereof; and wherein the acidic electrolyte is present in the catholyte in a concentration of between about 1 M and about 16 M.

A sixty-ninth aspect, which is the method of any of the sixty-fourth through sixty-eighth aspects, wherein the anolyte comprises an alkaline electrolyte; wherein the alkaline electrolyte comprises at least one of ammonia, methylamine, glycine, lithium hydroxide, sodium hydroxide, potassium hydroxide, caesium hydroxide, rubidium hydroxide, calcium hydroxide, strontium hydroxide, barium hydroxide, and any mixture thereof; and wherein the alkaline electrolyte is present in the anolyte in an amount of 30-55 wt. %, based on the total weight of the anolyte.

A seventieth aspect, which is a method for producing energy comprising: discharging a membraneless high voltage zinc (Zn)-anode battery to a discharge voltage to produce energy, wherein the high voltage Zn-anode battery comprises: a cathode comprising a cathode electroactive material; an anode comprising an anode electroactive material, wherein the anode electroactive material comprises a Zn electroactive material comprising Zn, and wherein at least a portion of the Zn of the Zn electroactive material is oxidized during the discharging to form oxidized zinc; a catholyte in contact with the cathode, wherein the catholyte is not in contact with the anode, and wherein the catholyte has a pH of less than 4; an anolyte in contact with the anode, wherein the anolyte is not in contact with the cathode, and wherein the anolyte has a pH of greater than 10; and one or more buffer interlayers disposed between the anolyte and the catholyte, wherein the one or more buffer interlayers regulate a pH in the battery; and charging the high voltage Zn-anode battery to a charge voltage, wherein at least a portion of the oxidized zinc is reduced to Zn during the charging.

A seventy-first aspect, which is the method of the seventieth aspect, wherein the discharge voltage is equal to or greater than about 3 V.

A seventy-second aspect, which is the method of any of the sixty seventieth and seventy-first aspects, wherein the catholyte, the anolyte, and the one or more buffer interlayers are gelled or polymerized; and wherein the battery is a solid state battery.

Embodiments are discussed herein with reference to the Figures. However, those skilled in the art will readily appreciate that the detailed description given herein with respect to these figures is for explanatory purposes as the systems and methods extend beyond these limited embodiments. For example, it should be appreciated that those skilled in the art will, in light of the teachings of the present description, recognize a multiplicity of alternate and suitable approaches, depending upon the needs of the particular application, to implement the functionality of any given detail described herein, beyond the particular implementation choices in the following embodiments described and shown. That is, there are numerous modifications and variations that are too numerous to be listed but that all fit within the scope of the present description. Also, singular words should be read as plural and vice versa and masculine as feminine and vice versa, where appropriate, and alternative embodiments do not necessarily imply that the two are mutually exclusive.

It is to be further understood that the present description is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present systems and methods. It must be noted that as used herein and in the appended claims (in this application, or any derived applications thereof), the singular forms "a," "an," and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this description belongs. Preferred methods, techniques, devices, and materials are described, although any methods, techniques, devices, or materials similar or equivalent to those described herein may be used in the practice or testing of the present systems and methods. Structures described herein are to be understood also to refer to functional equivalents of such structures. The present systems and methods will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims may be formulated in this Application or of any further Application derived therefrom, to particular combinations of features, it should be understood that the scope of the disclosure also includes any novel feature or any novel combination of features disclosed herein either explicitly or implicitly or any generalization thereof, whether or not it relates to the same systems or methods as presently claimed in any Claim and whether or not it mitigates any or all of the same technical problems as do the present systems and methods.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new claims may be formulated to such features and/or combinations of such features during the prosecution of the present Application or of any further Application derived therefrom.

What is claimed is:

1. A buffer interlayer battery comprising:
   a cathode comprising a cathode electroactive material;
   an anode comprising an anode electroactive material;
   a catholyte in contact with the cathode, wherein the catholyte is not in contact with the anode, and wherein the catholyte has a pH of less than 4;
   an anolyte in contact with the anode, wherein the anolyte is not in contact with the cathode, and wherein the anolyte has a pH of greater than 10; and
   one or more buffer interlayers disposed between the anolyte and the catholyte, wherein the one or more buffer interlayers regulate a pH in the battery, and wherein the buffer interlayer battery does not comprise an ion-exchange membrane.

2. The battery of claim 1, wherein the one or more buffer interlayers are gelled or polymerized.

3. The battery of claim 1, wherein each of the one or more buffer interlayers individually has an acidic pH value of less than 7, a neutral pH value of 7, or a basic pH value of greater than 7.

4. The battery of claim 1, wherein the one or more buffer interlayers comprise at least two buffer interlayers, and wherein the buffer interlayers have the same or different pH values.

5. The battery of claim 1, wherein the one or more buffer interlayers comprise at least one acidic buffer interlayer and at least one basic buffer interlayer; wherein the at least one acidic buffer interlayer contacts the anolyte; and wherein the at least one basic buffer interlayer contacts the catholyte.

6. The battery of claim 1, wherein each of the one or more buffer interlayers individually comprises (i) a weak acid and a conjugate base, and/or (ii) a weak base and a conjugate acid.

7. The battery of claim 1, wherein each of the one or more buffer interlayers individually comprises a buffer system selected from the group consisting of (a) sodium acetate, acetic acid; with a pH value of about 4 to about 4.5; (b) potassium phosphate monobasic, sodium hydroxide; with a pH value of about 7; (c) potassium hydrogen phthalate; with a pH value of about 4; (d) potassium carbonate, potassium tetraborate, potassium hydroxide, disodium EDTA dihydrate; with a pH value of about 10; (e) Tris buffered saline (sodium chloride, potassium chloride, Tris/Tris-HCl); with a pH value of about 7.4; (f) potassium phosphate monobasic, sodium hydroxide; with a pH value of about 8; (g) potassium phosphate monobasic, sodium hydroxide; with a pH value of about 6; (h) potassium acid phthalate, sodium hydroxide; with a pH value of about 5; (i) potassium chloride, hydrochloric acid; with a pH value of about 1; (j) potassium chloride, hydrochloric acid; with a pH value of about 2; (k) boric acid, potassium chloride, sodium hydroxide; with a pH value of about 9; (l) Tris-EDTA; with a pH value of about 8; (m) Tris hydrochloride; with a pH value of about 7.5; (n) potassium acid phthalate, hydrochloric acid; with a pH value of about 3; (o) buffer concentrate; with a pH value of about 11; (p) buffer solution concentrate; with a pH value of about 6; (q) sodium chloride-Tris-EDTA; with a pH value of about 8; (r) Tris-acetate-EDTA, Tris-borate-EDTA, phosphate buffer, borax standard buffer, Tris-glycine-SDS; with varying pH values; (s) disodium phosphate, citric acid; with a pH value of about 3 to about 8; (t) citric acid, monopotassium phosphate, boric acid, diethyl barbituric acid; with a pH value of about 2.6 to about 12; (u) dihydrogen potassium phosphate, sodium phosphate dibasic; with a pH value of about 7; (v) potassium hydrogen phthalate, sodium hydroxide; with a pH value of about 5; (w) potassium biphthalate, sodium hydroxide; with a pH value of about 5; or (x) any combinations of (a)-(w).

8. The battery of claim 1, wherein the battery is characterized by an average discharge potential of from about 2 V to about 5 V.

9. The battery of claim 1, wherein the battery is characterized by an average discharge potential of equal to or greater than about 3 V.

10. The battery of claim 1, wherein the anolyte comprises a first gelled or polymerized electrolyte solution, and wherein the catholyte comprises a second gelled or polymerized electrolyte solution.

11. The battery of claim 1, wherein the battery is a solid state battery.

12. The battery of claim 1, wherein the cathode electroactive material comprises at least one of a manganese oxide, manganese dioxide ($MnO_2$), $Mn_2O_3$, $Mn_3O_4$, MnO; a manganese hydroxide, MnOOH, $Mn(OH)_2$; a silver oxide, AgO, $Ag_2O$; silver (Ag); nickel (Ni); a nickel oxide, NiO, $Ni_2O_3$; a nickel hydroxide, NiOOH, $Ni(OH)_2$; a cobalt oxide, $Co_3O_4$, CoO; a cobalt hydroxide; lead (Pb); a lead oxide, PbO, $PbO_2$; a copper oxide; copper (Cu); a copper hydroxide; potassium iron oxide ($K_2FeO_4$); barium iron oxide ($BaFeO_4$); copper hexacyanoferrate; lithium iron phosphate; lithium nickel manganese cobalt oxide; a lithium manganese oxide, $LiMn_2O_4$, $Li_2MnO_3$; calix[4]quinone; 1,4-napththo-quinone; 9,10-anthraquinone; vanadium oxide; or any mixture thereof.

13. The battery of claim 1, wherein the cathode comprises a conductive carbon, wherein the conductive carbon is mixed with the cathode electroactive material, and wherein the conductive carbon comprises graphite, carbon fiber, carbon black, acetylene black, single walled carbon nanotubes, multi-walled carbon nanotubes, nickel coated carbon nanotubes, copper coated carbon nanotubes, dispersions of single walled carbon nanotubes, dispersions of multi-walled carbon nanotubes, graphene, graphyne, graphene oxide, or any combinations thereof.

14. The battery of claim 1, wherein the cathode comprises an additive and/or dopant, and wherein the additive and/or dopant comprises bismuth, bismuth oxide, copper oxide, copper, indium, indium hydroxide, indium oxide, aluminum, aluminum oxide, nickel, nickel hydroxide, nickel oxide, silver, silver oxide, cobalt, cobalt oxide, cobalt hydroxide, lead, lead oxide, lead dioxide, quinones, or a combination thereof.

15. The battery of claim 1, wherein the cathode comprises a binder, and wherein the binder comprises methyl cellulose (MC), carboxymethyl cellulose (CMC), hydroxypropyl cellulose (HPH), hydroxypropylmethyl cellulose (HPMC), hydroxethylmethyl cellulose (HEMC), carboxymethylhydroxyethyl cellulose, hydroxyethyl cellulose (HEC), polyvinyl alcohol, TEFLON, or a combination thereof.

16. The battery of claim 1, wherein the cathode comprises a pressed cathode material on a current collector, wherein the current collector comprises carbon, lead, nickel, steel, stainless steel, nickel-coated steel, nickel plated copper, tin-coated steel, copper plated nickel, silver coated copper, copper, magnesium, aluminum, tin, iron, platinum, silver, gold, bismuth, titanium, cold rolled steel, half nickel and half copper, polypropylene, or any combination thereof.

17. The battery of claim 16, wherein the current collector is a foil, mesh, perforated foil, foam, felt, fibrous, porous block architecture, honey-combed mesh, sponge-shaped, or any combinations thereof.

18. The battery of claim 1, wherein the cathode comprises 1-99 wt. % of a cathode electroactive material, 1-99 wt. % of a conductive carbon, 0-30 wt. % of an additive and/or dopant, and 0-10 wt. % of a binder, based on a total weight of the cathode.

19. The battery of claim 1, wherein the anode electroactive material comprises zinc (Zn); aluminum (Al); magnesium (Mg); iron (Fe); iron oxide, $Fe_2O_3$ $Fe_3O_4$; bismuth (Bi); indium (In); copper (Cu); a manganese oxide, manganese dioxide ($MnO_2$), $Mn_2O_3$, $Mn_3O_4$; or any mixture thereof.

20. The battery of claim 19, wherein the anode electroactive material is a powder, foil, mesh, foam, sponge, perforated foil, or a combination thereof.

21. The battery of claim 1, wherein the anode electroactive material comprises a Zn electroactive material.

22. The battery of claim 1, wherein the anode comprises conductive carbon, wherein the conductive carbon is mixed with the anode electroactive material, and wherein the carbon comprises graphite, carbon fiber, carbon black, acetylene black, single walled carbon nanotubes, multi-walled carbon nanotubes, nickel coated carbon nanotubes, copper coated carbon nanotubes, dispersions of single walled carbon nanotubes, dispersions of multi-walled carbon nanotubes, graphene, graphyne, graphene oxide, or any combinations thereof.

23. The battery of claim 1, wherein the anode comprises an additive and/or dopant, and wherein the additive and/or dopant comprises bismuth, bismuth oxide, indium, indium oxide, indium hydroxide, cetyltrimethylammonium bromide, sodium dodecyl sulfate, calcium hydroxide, sodium dodecylbenzene sulfonate, polyethylene glycol, zinc oxide, or a combination thereof.

24. The battery of claim 1, wherein the anode comprises a binder, and wherein the binder comprises methyl cellulose (MC), carboxymethyl cellulose (CMC), hydroxypropyl cellulose (HPH), hydroxypropylmethyl cellulose (HPMC), hydroxethylmethyl cellulose (HEMC), carboxymethylhydroxyethyl cellulose, hydroxyethyl cellulose (HEC), polyvinyl alcohol, TEFLON, or a combination thereof.

25. The battery of claim 1, wherein the anode comprises a pressed anode material on a current collector, wherein the current collector comprises carbon, lead, nickel, steel, stainless steel, nickel-coated steel, nickel plated copper, tin-coated steel, copper plated nickel, silver coated copper, copper, magnesium, aluminum, tin, iron, platinum, silver, gold, bismuth, titanium, zinc, cold rolled steel, half nickel and half copper, polypropylene, or any combination thereof.

26. The battery of claim 25, wherein the current collector is a foil, mesh, perforated foil, foam, felt, fibrous, porous block architecture, honey-combed mesh, sponge-shaped, or any combinations thereof.

27. The battery of claim 1, wherein the anode comprises 1-100 wt. % of a Zn electroactive material, 0-10 wt. % of a conductive carbon, 0-30 wt. % of an additive and/or dopant, and 0-10 wt. % of a binder, based on a total weight of the anode.

28. The battery of claim 1, wherein the catholyte comprises an acidic electrolyte; and wherein the acidic electrolyte comprises at least one of hydrogen phosphate, bicarbonates, ammonium cation, hydrogen sulfide, acetic acid, hydrogen fluoride, phosphoric acid, sulfuric acid, nitric acid, hydrochloric acid, hydrogen bromide, hydroiodic acid, triflic acid, or any mixture thereof.

29. The battery of claim 28, wherein the acidic electrolyte is present in the catholyte in a concentration of between about 0.1 M and about 16 M.

30. The battery of claim 1, wherein the catholyte comprises a catholyte additive; and wherein the catholyte additive comprises at least one of manganese sulfate, nickel sulfate, potassium permanganate, manganese chloride, manganese acetate, manganese triflate, bismuth chloride, bismuth nitrate, manganese nitrate, nickel sulfate, nickel nitrate, zinc sulfate, zinc chloride, zinc acetate, zinc triflate, indium chloride, copper sulfate, copper chloride, lead sulfate, sodium persulfate, potassium persulfate, ammonium persulfate, ammonium chloride, vanillin, potassium chloride, sodium chloride, lithium nitrate, lithium chloride, lithium carbonate, lithium acetate, lithium triflate, aluminum trifluoromethanesulfonate, aluminum chloride, aluminum nitrate, potassium sulfate, sodium sulfate, ammonium sulfate, or any mixture thereof.

31. The battery of claim 1, wherein the anolyte comprises an alkaline electrolyte; and wherein the alkaline electrolyte comprises at least one of ammonia, methylamine, glycine, lithium hydroxide, sodium hydroxide, potassium hydroxide, caesium hydroxide, rubidium hydroxide, calcium hydroxide, strontium hydroxide, barium hydroxide, or any mixture thereof.

32. The battery of claim 31, wherein the alkaline electrolyte is present in the anolyte in an amount of 20-60 wt. %, based on the total weight of the anolyte.

33. The battery of claim 1, wherein the anolyte comprises an anolyte additive; and wherein the anolyte additive comprises at least one of vanillin, indium hydroxide, zinc acetate, zinc oxide, cetyltrimethylammonium bromide, sodium dodecyl sulfate, sodium dodecylbenzene sulfonate, polyethylene glycol, ethanol, methanol, zinc gluconate, glucose, or any mixture thereof.

34. The battery of claim 1, wherein the catholyte, the anolyte, or both are gelled or polymerized.

35. The battery of claim 1,
wherein the anode electroactive material comprises a Zn electroactive material;
wherein the catholyte has a pH of less than 2;
wherein the anolyte has a pH of greater than 12;
wherein the one or more buffer interlayers comprise at least one acidic buffer interlayer and/or at least one basic buffer interlayer;
wherein the at least one acidic buffer interlayer, when present, contacts the anolyte; and
wherein the at least one basic buffer interlayer, when present, contacts the catholyte.

36. The battery of claim 35, wherein the one or more buffer interlayers are gelled or polymerized.

37. The battery of claim 35, wherein each of the one or more buffer interlayers individually comprises (i) a weak acid and a conjugate base, and/or (ii) a weak base and a conjugate acid.

38. The battery of claim 35, wherein the catholyte comprises an acidic electrolyte; wherein the acidic electrolyte comprises at least one of hydrogen phosphate, bicarbonates, ammonium cation, hydrogen sulfide, acetic acid, hydrogen fluoride, phosphoric acid, sulfuric acid, nitric acid, hydrochloric acid, hydrogen bromide, hydroiodic acid, triflic acid, or any mixture thereof; and wherein the acidic electrolyte is present in the catholyte in a concentration of between about 1 M and about 16 M.

39. The battery of claim 35, wherein the anolyte comprises an alkaline electrolyte; wherein the alkaline electrolyte comprises at least one of ammonia, methylamine, glycine, lithium hydroxide, sodium hydroxide, potassium hydroxide, caesium hydroxide, rubidium hydroxide, calcium hydroxide, strontium hydroxide, barium hydroxide, or any mixture thereof; and wherein the alkaline electrolyte is present in the anolyte in an amount of 30-55 wt. %, based on the total weight of the anolyte.

40. The battery of claim 35, wherein the battery is characterized by an average discharge potential of from about 3 V to about 5 V.

41. The battery of claim 35, wherein the catholyte, the anolyte, and the one or more buffer interlayers are gelled or polymerized; and wherein the battery is a solid state battery.

42. A method of forming a buffer interlayer zinc (Zn)-anode battery, the method comprising:
disposing a catholyte in contact with a cathode, wherein the cathode comprises a cathode electroactive material, and wherein the catholyte has a pH of less than 4;
disposing an anolyte in contact with an anode, wherein the anode comprises a Zn electroactive material, and wherein the anolyte has a pH of greater than 10; and
disposing at least one buffer interlayer between the anolyte and the catholyte, wherein the catholyte is not in contact with the anode, wherein the anolyte is not in contact with the cathode, wherein the one or more buffer interlayers regulate a pH in the battery, and wherein the buffer interlayer zinc (Zn)-anode battery does not comprise an ion-exchange membrane.

43. The method of claim 42, further comprising disposing the catholyte, the anolyte, the anode, the cathode, and the at least one buffer interlayer in a housing to form the buffer interlayer Zn-anode battery.

44. The method of claim 42, wherein the at least one buffer interlayer is gelled or polymerized.

45. The method of claim 42, wherein each of the at least one buffer interlayer individually comprises (i) a weak acid and a conjugate base, and/or (ii) a weak base and a conjugate acid.

46. The method of claim 42, wherein the catholyte comprises an acidic electrolyte; wherein the acidic electrolyte comprises at least one of hydrogen phosphate, bicarbonates, ammonium cation, hydrogen sulfide, acetic acid, hydrogen fluoride, phosphoric acid, sulfuric acid, nitric acid, hydrochloric acid, hydrogen bromide, hydroiodic acid, triflic acid, or any mixture thereof; and wherein the acidic electrolyte is present in the catholyte in a concentration of between about 1 M and about 16 M.

47. The method of claim 42, wherein the anolyte comprises an alkaline electrolyte; wherein the alkaline electrolyte comprises at least one of ammonia, methylamine, glycine, lithium hydroxide, sodium hydroxide, potassium hydroxide, caesium hydroxide, rubidium hydroxide, calcium hydroxide, strontium hydroxide, barium hydroxide, or any mixture thereof; and wherein the alkaline electrolyte is present in the anolyte in an amount of 30-55 wt. %, based on the total weight of the anolyte.

48. A method for producing energy comprising:
discharging a buffer interlayer high voltage zinc (Zn)-anode battery to a discharge voltage to produce energy, wherein the buffer interlayer high voltage Zn-anode battery comprises:
a cathode comprising a cathode electroactive material;
an anode comprising an anode electroactive material, wherein the anode electroactive material comprises a Zn electroactive material comprising Zn, and wherein at least a portion of the Zn of the Zn electroactive material is oxidized during the discharging to form oxidized zinc;
a catholyte in contact with the cathode, wherein the catholyte is not in contact with the anode, and wherein the catholyte has a pH of less than 4;
an anolyte in contact with the anode, wherein the anolyte is not in contact with the cathode, and wherein the anolyte has a pH of greater than 10; and
one or more buffer interlayers disposed between the anolyte and the catholyte, wherein the one or more buffer interlayers regulate a pH in the battery, wherein the buffer interlayer high voltage Zn-anode batter does not comprise an ion exchange membrane; and charging the high voltage Zn-anode battery to a charge voltage, wherein at least a portion of the oxidized zinc is reduced to Zn during the charging.

49. The method of claim 48, wherein the discharge voltage is equal to or greater than about 3 V.

50. The method of claim 48, wherein the catholyte, the anolyte, and the one or more buffer interlayers are gelled or polymerized; and wherein the battery is a solid state battery.

* * * * *